United States Patent
Cho

(10) Patent No.: US 8,847,850 B1
(45) Date of Patent: Sep. 30, 2014

(54) HEAD MOUNTED DISPLAY DEVICE FOR DISPLAYING AUGMENTED REALITY IMAGE CAPTURE GUIDE AND CONTROL METHOD FOR THE SAME

(71) Applicant: LG Electronics Inc., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/212,845

(22) Filed: Mar. 14, 2014

(30) Foreign Application Priority Data

Feb. 17, 2014 (KR) ........................ 10-2014-0017877

(51) Int. Cl.
*G09G 5/00* (2006.01)
*G02B 27/01* (2006.01)

(52) U.S. Cl.
CPC .................................. *G02B 27/017* (2013.01)
USPC ............................ 345/7; 345/9; 348/E13.051

(58) Field of Classification Search
CPC .......... H04N 21/4312; H04N 21/4314; H04N 21/482; H04N 5/44543; H04N 7/18; H04N 21/4532; H04N 21/472; H04N 5/23293
USPC .......................................................... 345/7–9
See application file for complete search history.

(56) References Cited

U.S. PATENT DOCUMENTS

| 7,487,468 B2 * | 2/2009 | Tanaka et al. ................. 715/863 |
| 7,936,384 B2 | 5/2011 | Sawachi |
| 8,558,759 B1 * | 10/2013 | Prada Gomez et al. ........... 345/7 |

\* cited by examiner

*Primary Examiner* — Duc Dinh
(74) *Attorney, Agent, or Firm* — Birch, Stewart, Kolasch & Birch, LLP

(57) ABSTRACT

The present disclosure relates to HMD device that displays an image capture guide as an augmented reality image and a control method for the same. More particularly, detecting a marker positioned within a viewing angle and displaying a capture guide frame as an augmented reality image based on the detected marker, wherein, when the marker is detected at a first position having a first distance from the camera unit, display a first capture guide frame having a first size based on the first position of the marker; and when the marker is detected at a second position having a second distance from the camera unit, display a second capture guide frame having a second size based on the second position of the marker, wherein, when the first distance is greater than the second distance, the first size is greater than the second size.

15 Claims, 22 Drawing Sheets

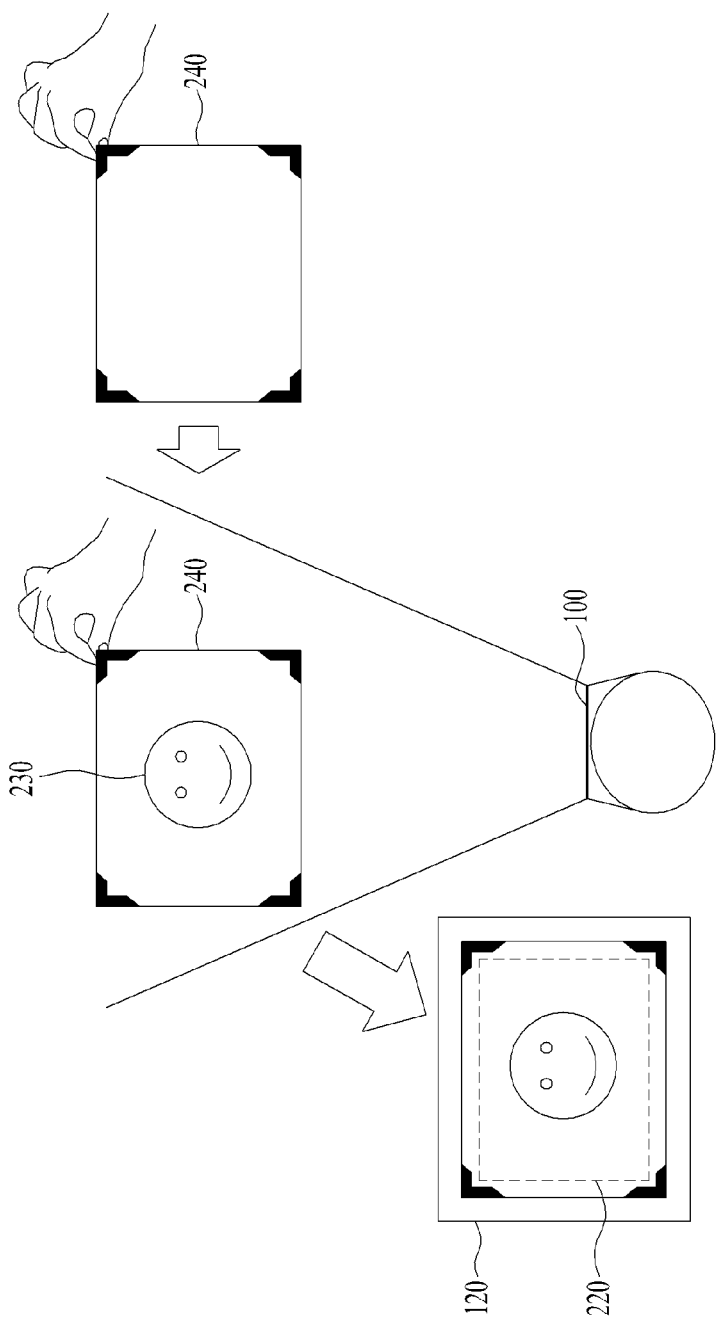

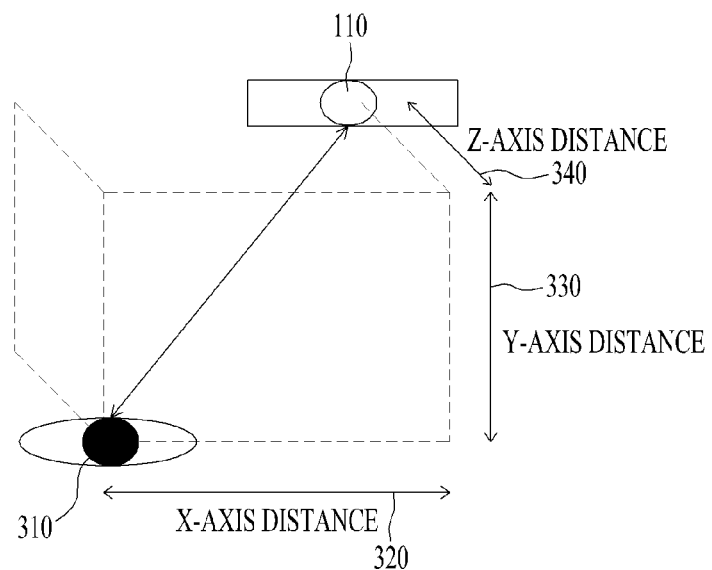

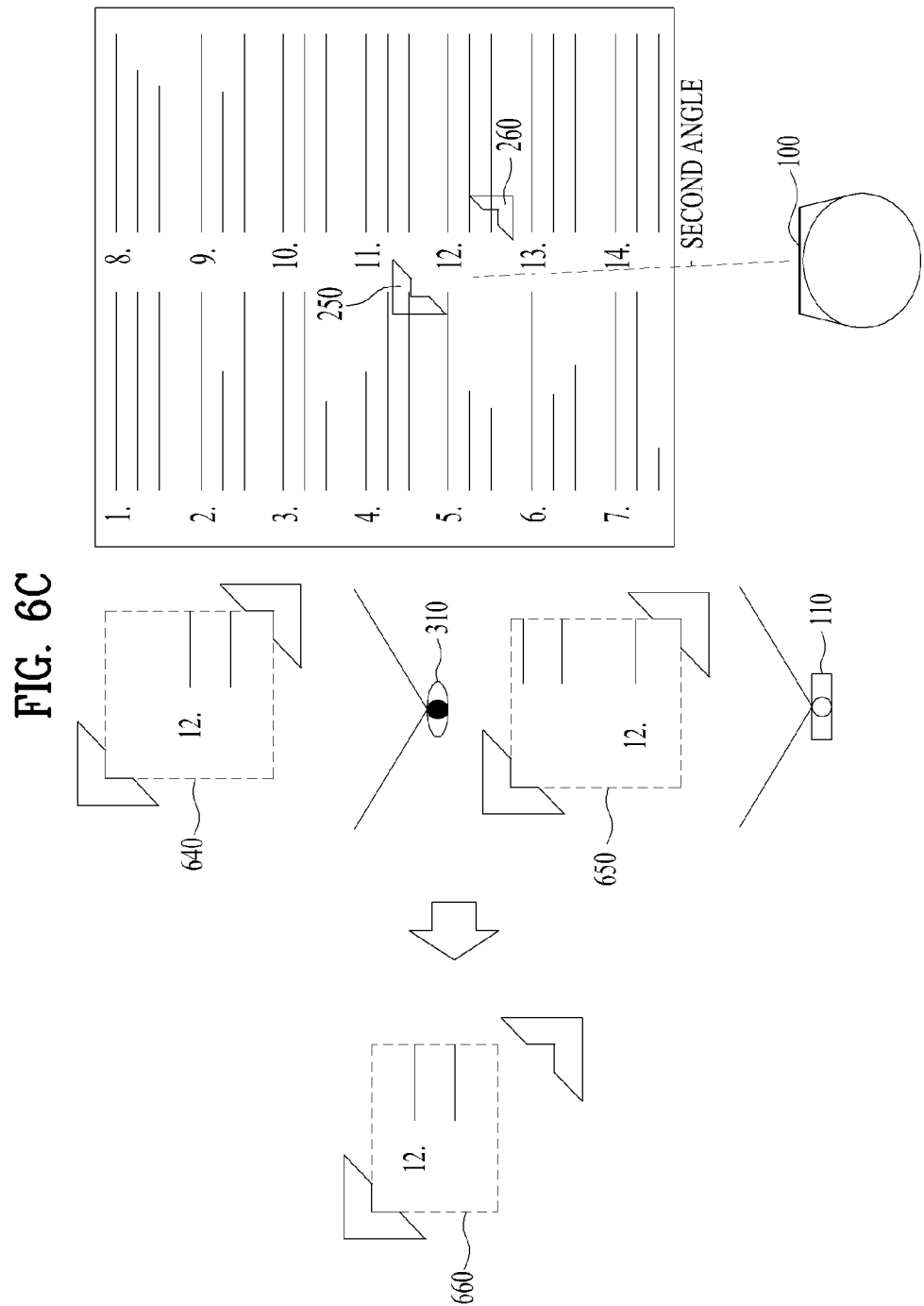

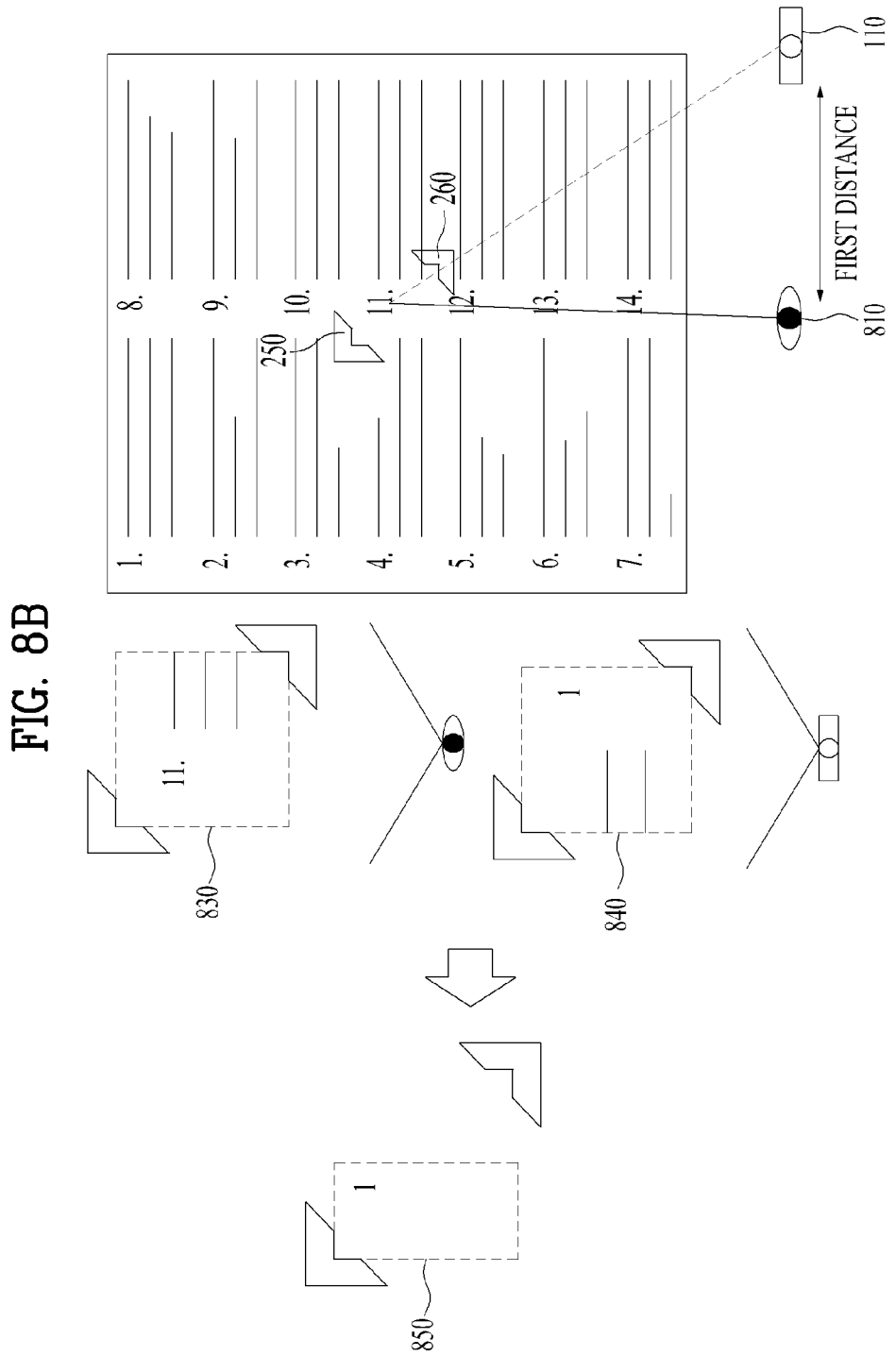

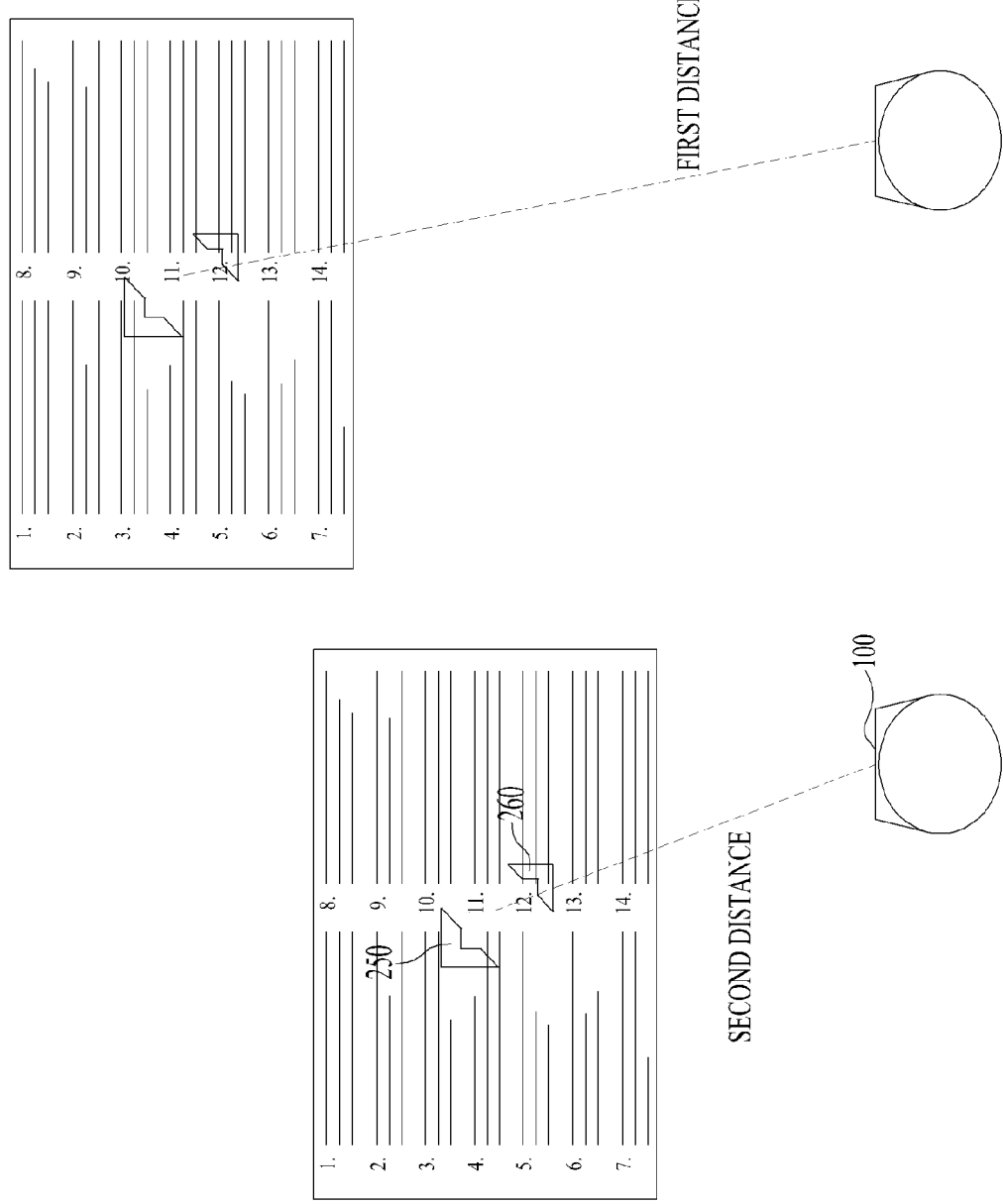

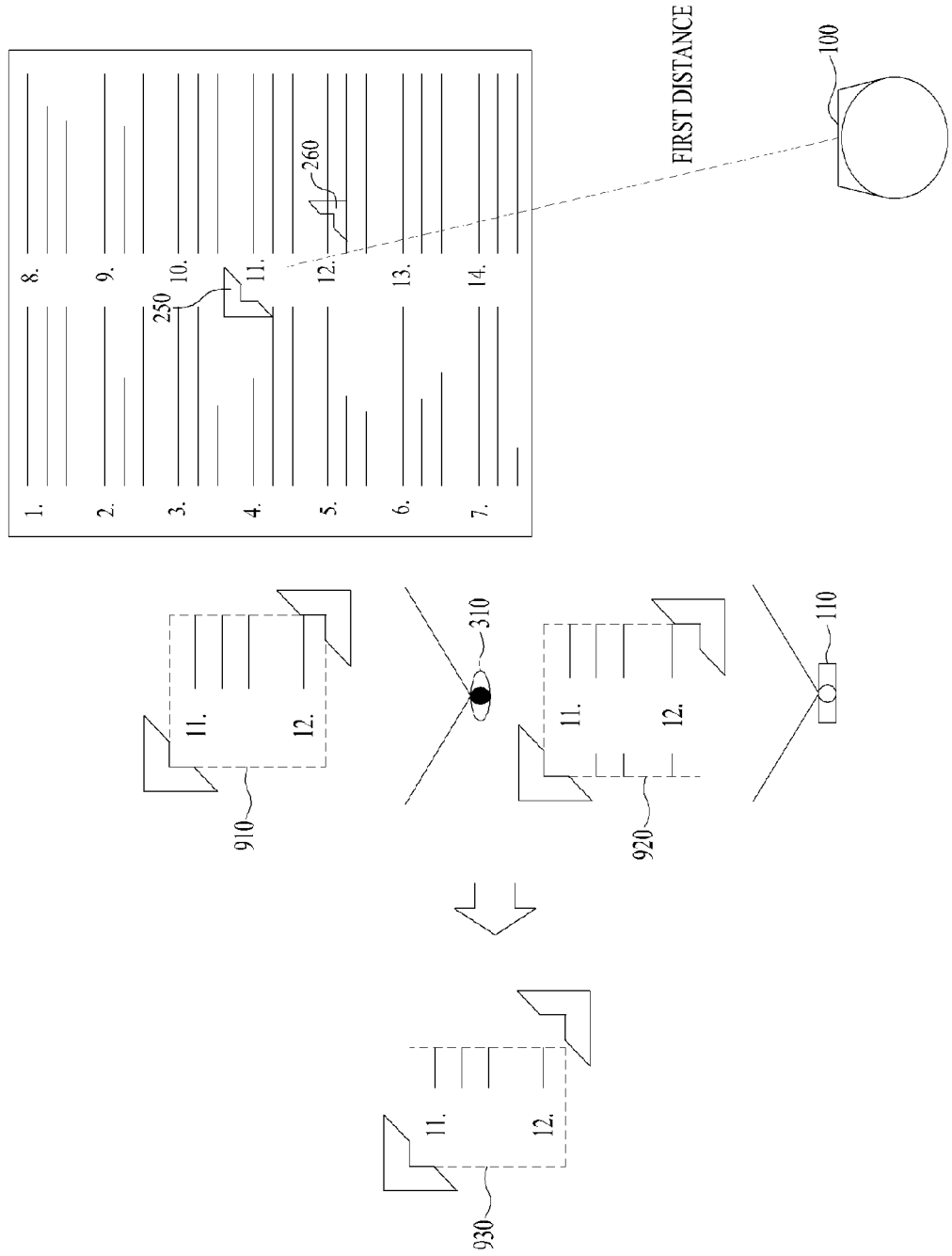

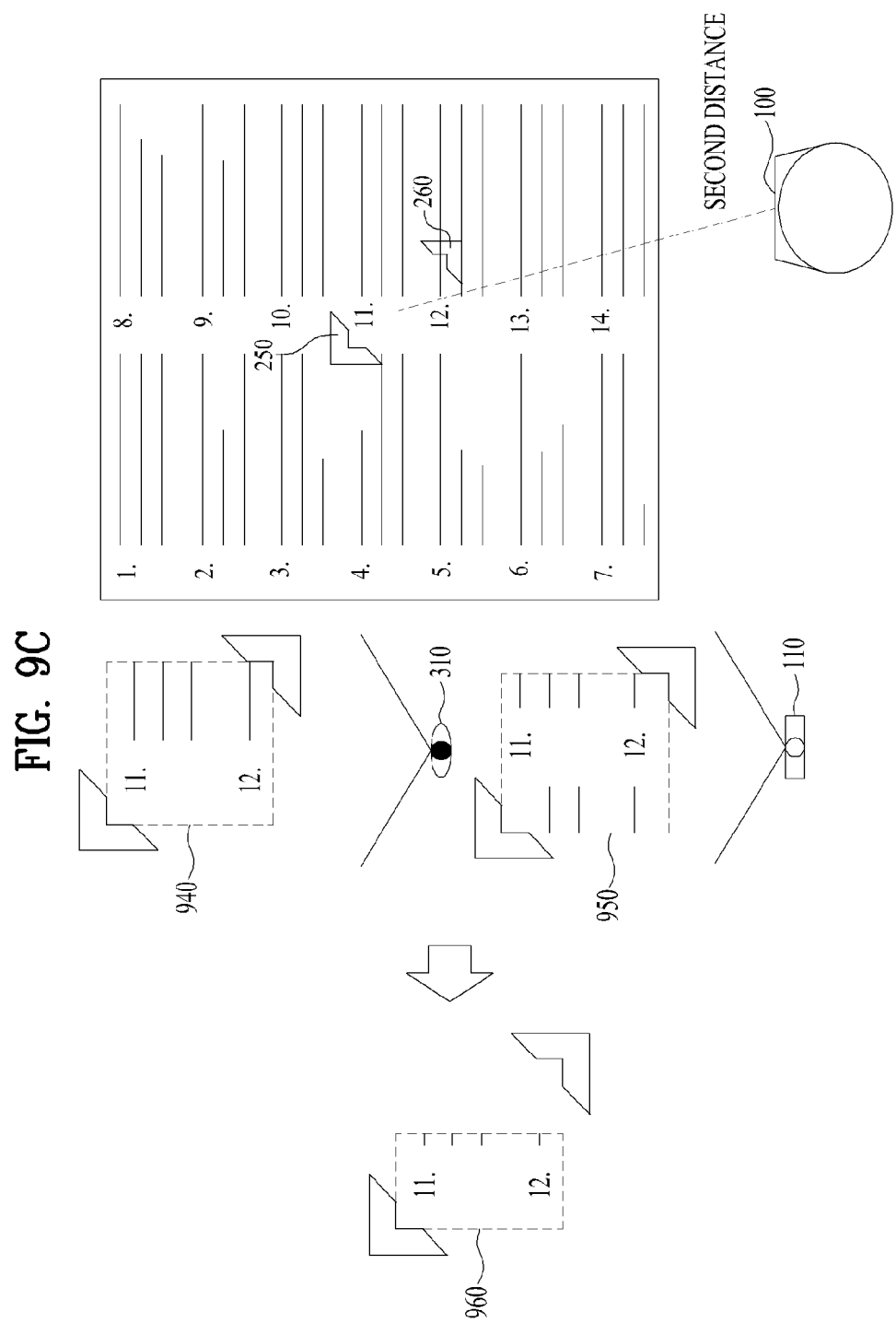

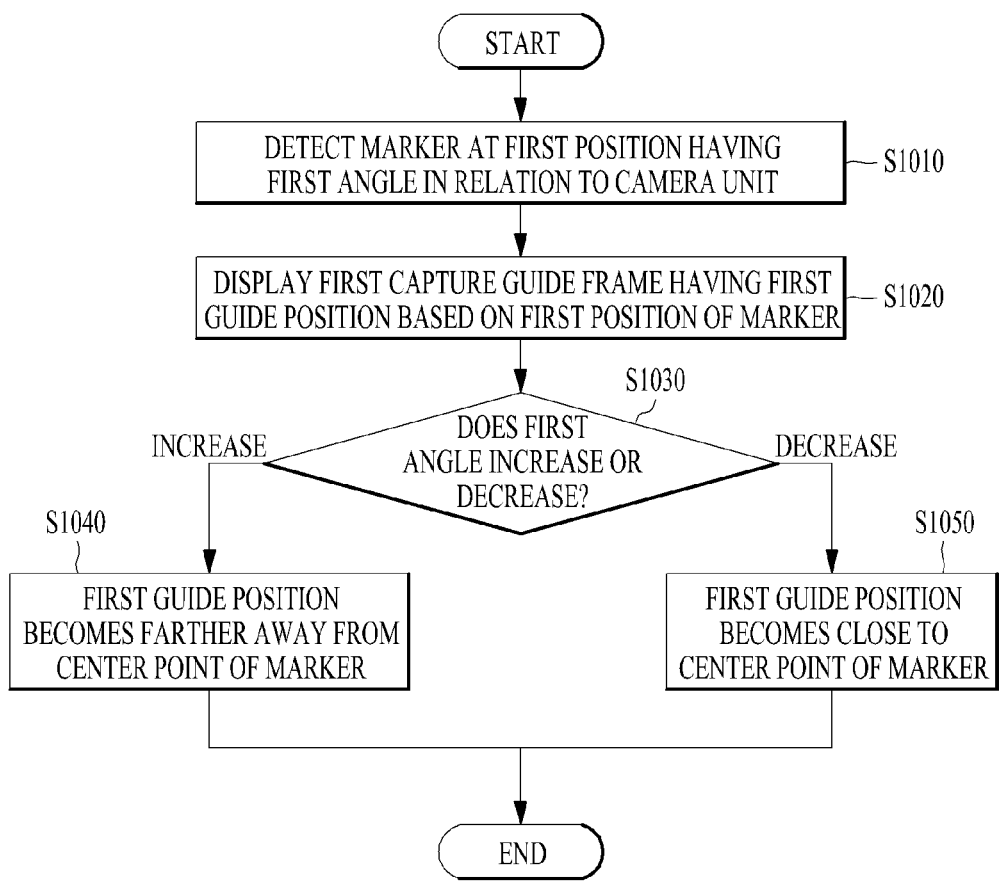

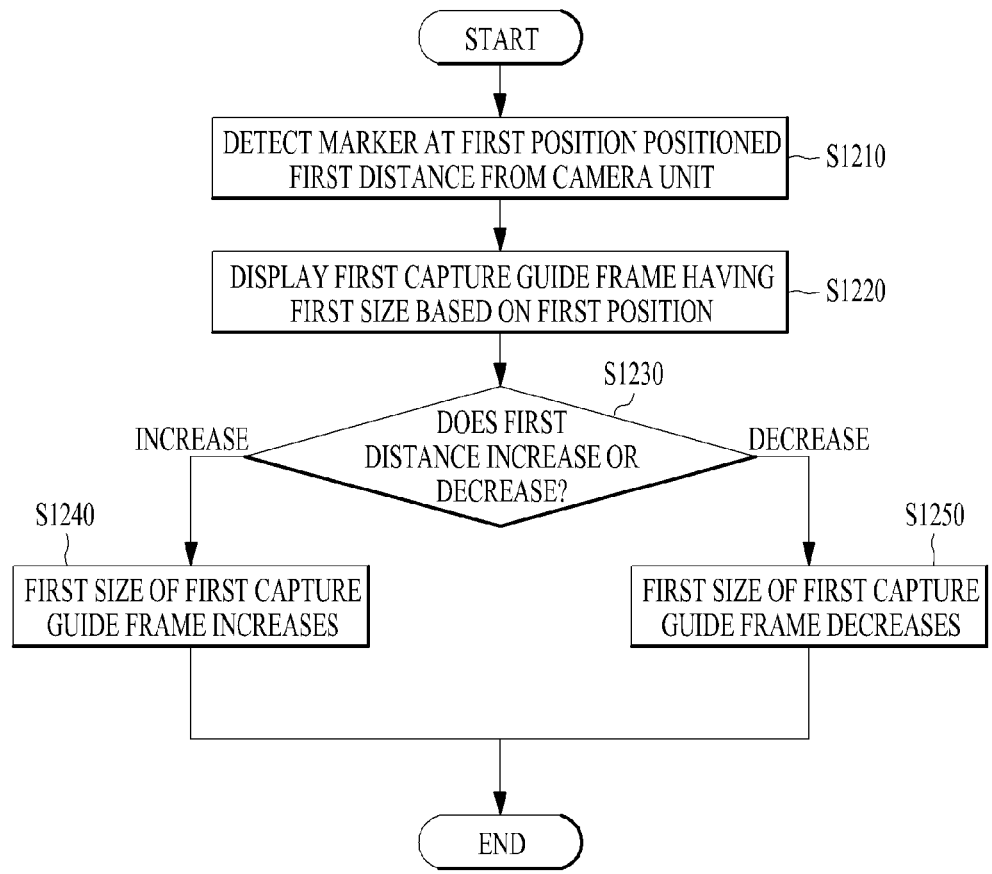

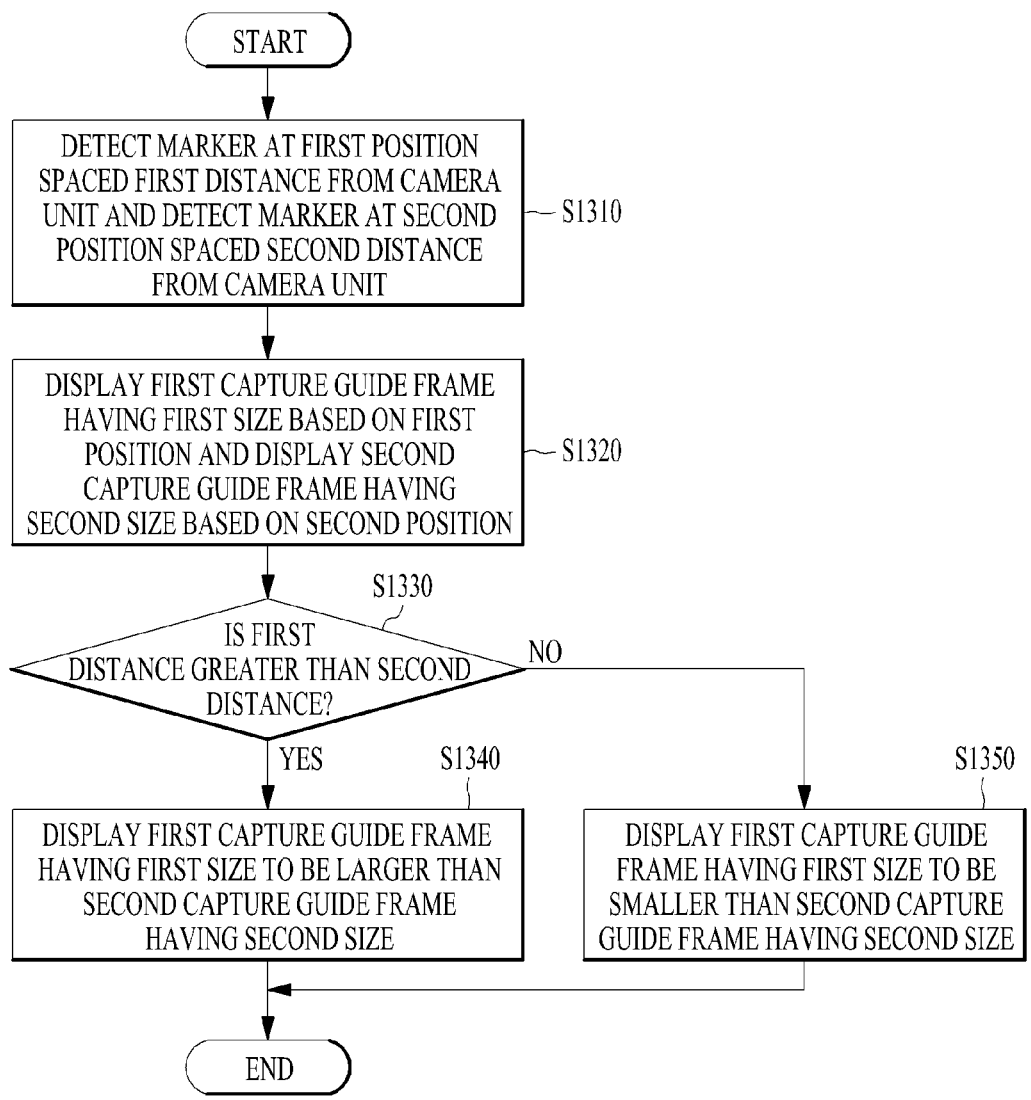

HEAD MOUNTED DISPLAY DEVICE FOR DISPLAYING AUGMENTED REALITY IMAGE CAPTURE GUIDE AND CONTROL METHOD FOR THE SAME

Pursuant to 35 U.S.C. §119(a), this application claims the benefit of the Korean Patent Application No. 10-2014-0017877, filed on Feb. 17, 2014, which is hereby incorporated by reference as if fully set forth herein.

BACKGROUND OF THE INVENTION

1. Field of the Invention

The present disclosure relates to a head mounted display (HMD) device that displays an image capture guide as an augmented reality image and a control method for the same. More particularly, the present disclosure relates to a method for an HMD device to control the size and position of the capture guide frame based on an angle of a marker in relation to the HMD device when the HMD device displays a capture guide frame by detecting the marker.

2. Discussion of the Related Art

Augmented reality technology producing a mixture of a real object and a virtual object allows a user to view a real object along with an augmented reality object, thereby providing sense of reality and additional information. For example, when a real environment around a camera of a smartphone is shown on the camera, augmented reality objects such as positions and phone numbers of nearby stores are stereoscopically displayed along with a rear object. Augmented reality technology is applicable to wearable computers. Particularly, head-worn type displays such as the HMD device provide augmented reality to the user by superimposing augmented reality images or characters on the real environment that the user views and displaying the same in real time.

The HMD device may detect a real object with a camera and display an augmented reality object based on the marker. In addition, the HMD device may set a capturable region with an augmented reality object corresponding to the detected marker. At this time, due to difference in position between the HMD device and the user's eyes, the position of the maker detected by the HMD device may differ from the position of a marker detected by the user's eyes. That is, in the case that a capturable region is set with an augmented reality object corresponding to the marker detected by the HMD device, the HMD device may set the capturable region to a position different from the position of the capturable region set by the user.

Accordingly, when the HMD device sets a capturable region with an augmented reality object corresponding to the marker, the HMD device needs to calibrate the capturable region set with the augmented reality object in consideration of difference in position between the user's eyes and the HMD device.

SUMMARY OF THE INVENTION

Accordingly, the present disclosure is directed to a head mounted display (HMD) device displaying a capture guide frame with an augmented reality image and a control method for the same which substantially obviate one or more problems due to limitations and disadvantages of the related art.

An object of the present invention is to provide a method for an HMD device to set the position of a displayed capture guide frame based on an angle of a marker in relation to a camera, in the case that the HMD device detects the marker.

Another object of the present invention is to provide a method for an HMD device to set the size of a displayed capture guide frame based on an angle of a marker in relation to a camera, in the case that the HMD device detects the marker.

Another object of the present invention is to provide a method for an HMD device to set the size of a displayed capture guide frame based on a distance between a marker and a camera, in the case that the HMD device detects the marker.

Another object of the present invention is to provide a method for an HMD device to set the position of a displayed capture guide frame based on a distance between a marker and a camera, in the case that the HMD device detects the marker.

Another object of the present invention is to provide a method for an HMD device to set the position of a displayed capture guide frame based on a distance between a camera and a user's eye, in the case that the HMD device detects a marker.

Another object of the present invention is to provide a method for an HMD device to display, in the case that a marker includes first and second markers, a capture guide frame based on the positions at which the first and second markers are detected.

A further object of the present invention is to provide a method for an HMD device to detect a user's hand as a marker.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present disclosure, as embodied and broadly described herein, a head mounted display (HMD) device includes a camera unit configured to detect a marker positioned within a viewing angle, a display unit configured to display a capture guide frame as an augmented reality image, based on the detected marker, a processor configured to control the camera unit and the display unit, wherein the processor displays, when the marker is detected at a first position having a first angle in relation to the camera unit, a first capture guide frame having a first guide position based on the first position of the marker, and the processor displays, when the marker is detected at a second position having a second angle in relation to the camera unit, a second capture guide frame having a second guide position based on the second position of the marker, wherein, when the first angle is greater than the second angle, the first guide position is farther away from a center point of the marker than the second guide position.

When the marker is detected at a first position having a first distance from the camera unit, a first capture guide frame having a first size may be displayed based on the first position of the marker. When the marker is detected at a second position having a second distance from the camera unit, a second capture guide frame having a second size may be displayed based on the second position of the marker. When the first distance is greater than the second distance, the first size may be greater than the second size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiment(s) of the invention and together with the description serve to explain the principle of the invention. In the drawings:

FIGS. 2A to 2C are views illustrating a method for an HMD device to detect a marker according to one embodiment;

FIGS. 3A and 3B are views illustrating a method for an HMD device to display a capture guide frame based on position information of a camera unit and a user's eye according to one embodiment;

FIGS. 6A to 6C are views illustrating a method for an HMD device to display a capture guide frame based on an angle of a marker when the HMD device detects the marker, according to one embodiment;

FIGS. 8A to 8C are views illustrating a method for setting a capture guide frame based on a camera unit and a user's two eyes according to one embodiment;

FIGS. 9A to 9C are views illustrating a method for an HMD device to display a capture guide frame based on a distance between a camera unit and a marker according to one embodiment;

FIG. 10 is a flowchart illustrating a method for an HMD device to display a capture guide frame based on a camera unit and an angle of a marker, according to one embodiment;

FIG. 12 is a flowchart illustrating a method for an HMD device to display a capture guide frame based on a distance between a camera unit and a marker, according to one embodiment; and FIG. 13 is a flowchart illustrating a method for an HMD device to control the size of a capture guide frame displayed based on a distance between a camera unit and a marker, according to one embodiment.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in this specification are selected, as much as possible, from general terms that are widely used in the art at present while taking into consideration of the functions, these terms may be replaced by other terms according to intensions of those skilled in the art, customs, emergence of new technologies, or the like. In addition, in a specific case, terms that are arbitrarily selected by the applicant may be used. In this case, meanings of these terms may be disclosed in corresponding description parts of this specification. Accordingly, it should be noted that the terms used herein should be construed based on practical meanings thereof and the whole content of this specification, rather than being simply construed based on names of the terms.

In the present disclosure, a head mounted display (HMD) device 100 may represent a wearable device which is wearable on a user's body to display visual information. More specifically, a user may wear the HMD device 100 as when wearing eyeglasses. The HMD device 100 may display a real object and an augmented reality object and provide visual information to the user wearing the HMD device 100. In addition, the HMD device 100 may detect a real object and display an augmented reality object corresponding to the real object. Herein, the real object may represent an object in the rear world that the user views though HMD device 100. The augmented reality object may represent a virtual image produced by the HMD device 100 that has detected the real object. More specifically, the augmented reality object may represent an image indicating a region which the camera unit of the HMD device 100 can capture based on the detected real object. In addition, the augmented reality object may represent an image indicating a region which the camera unit of the HMD device 100 can capture according to the user's eye gaze.

Figure 1:
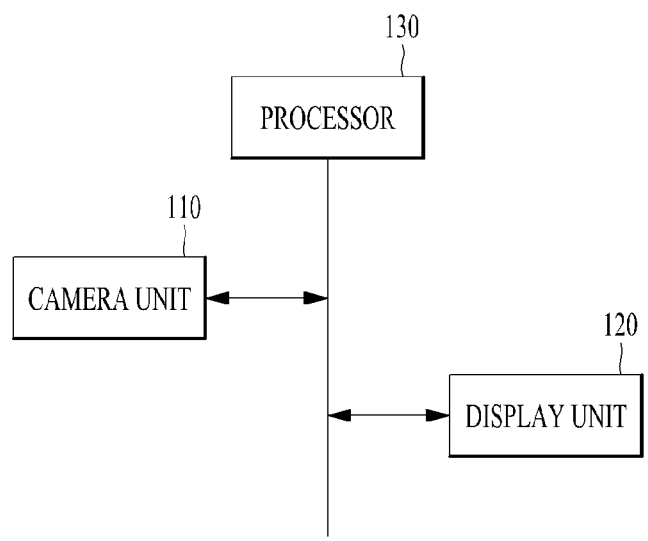
FIG. 1 is a block diagram illustrating a head mounted display (HMD) device according to an exemplary embodiment of the present disclosure.

FIG. 1 is a block diagram illustrating a head mounted display (HMD) device according to an exemplary embodiment of the present disclosure. The HMD device 100 may include a camera unit 110, a display unit 120 and a processor 130. The camera unit 110 captures an image of the surroundings of the HMD device 100 and converts the captured image into an electrical signal. To this end, the camera unit 110 may include an image sensor. The image sensor may convert an optical signal into an electrical signal. The image captured and converted into an electrical signal by the camera unit 110 may be stored in a storage unit (not shown) and then output to the processor 130, or may be output to the processor 130 without being stored. The camera unit 110 may also detect a marker positioned around the HMD device 100. Herein, the marker may be a real object for setting of a region captured by the camera unit 110. More specifically, the marker may be a user's gesture. In addition, the marker may be a frame provided by the user. Herein, the frame may be a real object including edges which can distinguish regions from each other. The user may use the frame as a marker to set a region which the camera unit 110 can capture. The marker is not limited to the examples described above. The marker will be discussed with reference to FIGS. 2A to 2C later.

The camera unit 110 may have a viewing angle. Herein, the viewing angle may represent an angle of a region in which the camera unit 110 detects a rear object positioned around the camera unit 110. The camera unit 110 may detect only real objects positioned within the viewing angle. In the case that a marker is positioned within the viewing angle of the camera unit 110, the processor 130 may use the marker to set a region which the camera unit 110 captures and stores as an image. Herein, the image may be a still image or a moving image.

In addition, the display unit 120 may output visual information based on content executed by the processor 130 or a control command of the processor 130. More specifically, the HMD device 100 may detect the marker with the camera unit 110 and display an augmented reality object based on the marker. At this time, the HMD device 100 may display an augmented reality image on the marker which the user views through transparent glass. The augmented reality image may be displayed within the marker. Herein, the augmented reality image may be a capture guide frame. The capture guide frame may be an augmented reality image indicating a region that the HMD device 100 can capture using the camera unit 110. More specifically, the capture guide frame may be an augmented reality image indicating a region that the camera unit 110 can capture based on a position where the marker is detected. In addition, the capture guide frame may be an augmented reality image indicating a region which the camera unit 110 can capture according to the user's eye gaze. The capture guide frame may be an overlap region between a region set by a marker detected by the camera unit 110 and a region set by a marker detected by the user's eye, which will be described later with reference to FIG. 4.

In addition, the camera unit 110 may detect the maker based on position information of the marker and the camera unit 110. Herein, the position information may be, for example, at least one of distance and angle. The camera unit 110 may also detect the marker based on position information of the user's eyes and the camera unit 110. Herein, the position information may be at least one of distance and angle. The camera unit 110 may also detect the marker based on position information of the marker and the user's eyes. Herein, the position information may be at least one of distance and angle. That is, the camera unit 110 may detect the marker and set a capture guide frame, based on the position information of the camera unit, the marker and the user's eyes.

The HMD device 100 may, for example, be provided with a sensor unit (not shown). The sensor unit may detect the position information of the marker and the camera unit 110. The sensor unit may also detect the position information about the user's eyes and the camera unit 110. In addition, the sensor unit may detect the positional information about the marker and the user's eyes. That is, the sensor unit may detect the marker, which is a real object, and acquire positional information about the marker and the user's eyes. Herein, the sensor unit may include at least one of an infrared sensor, a proximity sensor, an ultrasonic sensor, and an illumination sensor. In addition, the sensor unit may be a sensor that measures distance. However, the sensor unit is not limited to the above examples.

The camera unit 110 and the sensor unit may, for example, be integrated into one element. However, embodiments are not limited thereto.

The processor 130 may control the display unit 120 and the camera unit 110 using the information transferred from the camera unit 110. The processor 130 may display the capture guide frame using the marker detected by the camera unit. At this time, the processor 130 may acquire positional information about the marker and the camera unit 110. For example, the camera unit 110 may detect a distance and angle of the marker in relation to the camera unit 110, convert the detected values into electrical signals, and transfer the electrical signals to the processor 130. The processor 130 may acquire the angle and distance of the marker in relation to the camera unit 110 using the electrical signals transferred from the camera unit 110. At this time, the processor 130 may adjust the size of the capture guide frame based on the distance and angle of the marker in relation to the camera unit 110. In addition, the processor 130 may set the position where the capture guide frame is displayed, based on the distance and angle of the marker in relation to the camera unit 110. A detailed description will be given later with reference to FIGS. 5A to 5C.

The aforementioned sensors may be included in the HMD device 100 as separate elements, or may be included in the HMD device 100 by being integrated into at least one element. In addition, the sensor unit 110 is not limited to the examples of sensors described above. It may employ other equivalent sensors.

Figure 2A:
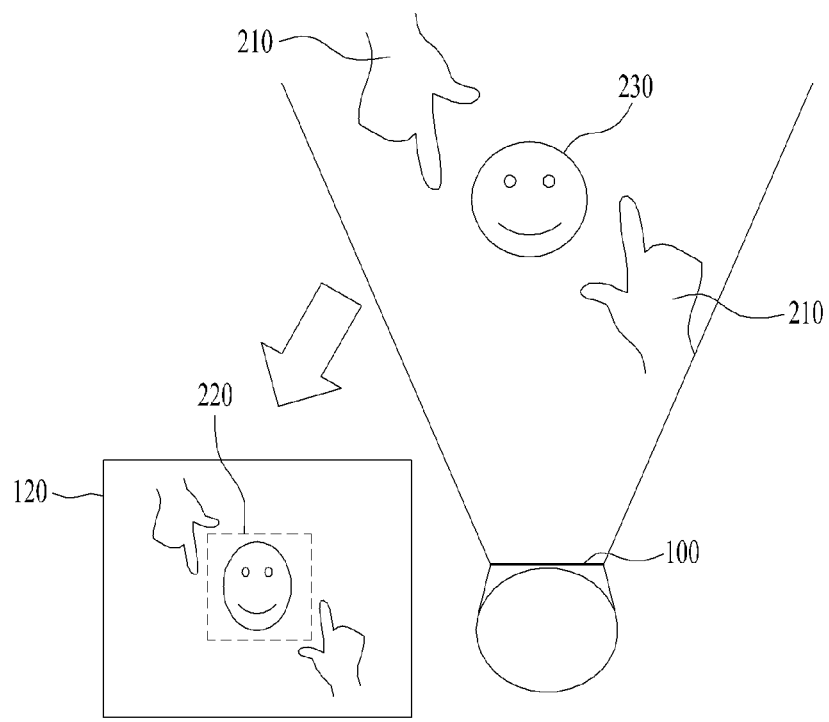
Figure 2C:
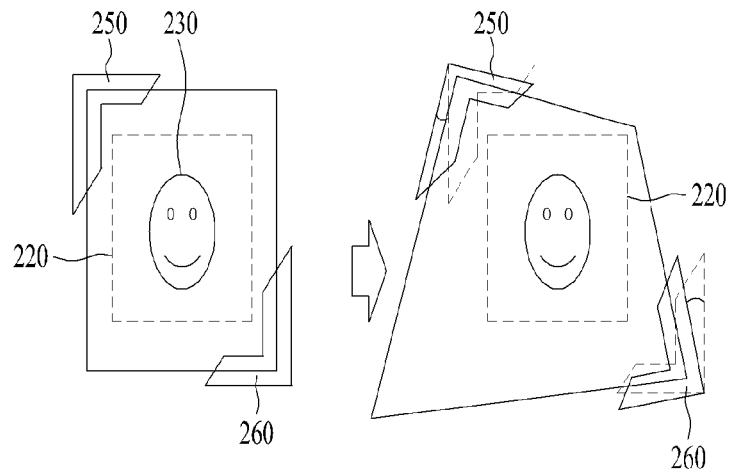

FIGS. 2A to 2C are views illustrating a method for the HMD device 100 to detect a marker according to one embodiment. The HMD device 100 may capture an image of the real object using the camera unit 110. The HMD device 100 may set a capture guide frame 220 through the camera unit 110. At this time, the capture guide frame 220 may represent a region which can be captured with the camera unit 110. More specifically, the HMD device 100 may capture an image of a real object 230 positioned in the capture guide frame 220 and store the image. Herein, the camera unit 110 may include an image sensor. The image sensor may store an image for the inner region of the capture guide frame 220. In addition, the image sensor may output the image for the inner region of the capture guide frame 220 to the display unit 120. According to an embodiment of the present disclosure, the capture guide frame 220 may be displayed in the shape of the image sensor unit. For example, the capture guide frame 220 may be set to be rectangular. In this case, the HMD device 100 may store and output the image in the shape of a rectangle. In addition, the capture guide frame 220 may be set to be circular. In this case, the HMD device 100 may store and output the image in the shape of a circle. Otherwise, the HMD device 100 may have the capture guide frame 220 set by the user or the processor 130. However, embodiments are not limited thereto.

The HMD device 100 may display the capture guide frame 220 based on a marker. More specifically, the HMD device 100 may detect a marker, which is a real object. The HMD device 100 may set the inner region of the marker to be the capture guide frame. Herein, the inner region of the marker may represent a region between the points of intersection of the extension lines of the marker. Herein, the extension lines of the marker may be determined by the marker. More specifically, in the case that the marker is the user's hand, the extension lines of the marker may be directions that the user's hand indicates. For example, in the case that the user keeps fingers spread out, the extension lines of the marker may be directions that the fingers of the user's hand indicate.

Referring to FIG. 2A, the marker may, for example, be the user's two hands 210. In this case, the user may keep thumbs and index fingers of both hands 210 spread out. The HMD device 100 may detect a point of intersection of a line extending from the thumb of the user's first hand and a line extending from the index finger of the second hand. In addition, the HMD device 100 may detect a point of intersection of a line extending from the thumb of the user's second hand and a line extending from the index finger of the first hand. At this time, the HMD device 100 may detect the aforementioned points of intersection using a sensor unit (not shown). Upon detecting the points of intersection, the HMD device 100 may display the capture guide frame 220 in a region between the points of intersection. That is, the inner region of the marker may be a region between the points of intersection. Accordingly, the HMD device 100 may adjust the position and size of the capture guide frame 220 by controlling the position of the marker. That is, the HMD device 100 may detect the position of the marker, which is a real object and then set the inner region of the marker to be the capture guide frame 220 based on the position of the marker.

Referring to FIG. 2B, the marker may be, for example, a real object having the shape of a frame 240. More specifically, the marker may be a real object capable of distinguishing the inner region from the outer region. For example, the frame 240 may be a rectangular frame, picture frame, album, or the like. In addition, the frame 240 may be a real object whose inner region and outer region may be distinguished from each. However, embodiments are not limited thereto. The HMD device 100 may detect the frame 240 and set the inner region of the frame 240 to be the capture guide frame 220. At this time, the HMD device 100 may set the capture guide frame 220 based on the shape of the frame 240. That is, the user may adjust the size and shape of the capture guide frame 220 through the frame 240, thereby, the user acquire a capturable image of the desired shape and size. According to an embodiment of the present disclosure, the frame 240 may be, for example, a quadrangle. Under such conditions, the HMD device 100 may detect the shape and size of the frame 240. The HMD device 100 may set the capture guide frame 220 in the inner region of the frame 240. At this time, the HMD device 100 may set the capture guide frame 220 to be rectangular. That is, the HMD device 100 may store and output an image of the inner region of the capture guide frame 220 having a rectangular shape.

Referring to FIG. 2C, in the case that the marker maintains a threshold angle, the HMD device 100 may set the capture guide frame 220. More specifically, the HMD device 100 may include a first marker 250 and a second marker 260 as the marker. As described above, the HMD device 100 may acquire the capture guide frame 220 in the inner region of the marker. In the case that the HMD device 100 includes the first marker 250 and the second marker 260, the HMD device 100 may detect a point of intersection of an extension line of the first marker 250 and an extension line of the second marker 260. Herein, the extension lines of the marker may be the directions that the markers indicate. That is, the first marker 250 may have an extension line extending downward from the lowermost portion of the first marker 250. In addition, the first marker 250 may have an extension line extending rightward from the rightmost portion of the first marker. The second marker 260 may have an extension line extending upward from the uppermost portion of the second marker 260. In addition, the first marker 250 may have an extension line extending leftward from the leftmost portion of the second marker 260.

The HMD device 100 may display the capture guide frame 220 in the inner region defined by the extension lines of the first marker 250 and the extension lines of the second marker 260. At this time, the HMD device 100 may display the capture guide frame 220 when an extension line of the first marker 250 and an extension line of the second marker 260 form a right angle. In addition, the HMD device 100 may display the capture guide frame 220 when an angle between an extension line of the first marker 250 and an extension line of the second marker 260 is between a right angle and the threshold angle.

More specifically, in the case that an extension line of the first marker 250 and an extension line of the second marker 260 form a right angle, the HMD device 100 may detect points of intersection of the extension lines of the first marker 250 and the extension lines of the second marker 260 and thus acquire a rectangular capture guide frame 220. On the other hand, in the case that an extension line of the first marker 250 and an extension line of the second marker 260 do not form a right angle, the HMD device 100 may not set the inner region of the marker. Accordingly, in the case that an extension line of the first marker 250 and an extension line of the second marker 260 do not form a right angle, the HMD device 100 calibrates the position of the first marker 250 or second marker 260 and acquires a rectangular capture guide frame 220. More specifically, the HMD device 100 may perform calibration of rotating the second marker 260 with respect to the first marker 250 to form a right angle between the extension lines of the first marker 250 and the second marker 260 and then acquire the rectangular capture guide frame 220. In addition, the HMD device 100 may perform calibration of rotating the first marker 250 with respect to the second marker 260 to form a right angle between the extension lines of the first marker 250 and the second marker 260 and then acquire the rectangular capture guide frame 220. In addition, the HMD device 100 may perform calibration of rotating both the first marker 250 and the second marker 260 to form a right angle between the extension lines of the first marker 250 and the second marker 260 and then acquire the rectangular capture guide frame 220.

In the case that an angle between an extension line of the first marker 250 and an extension line of the second marker 260 is between the right angle and the threshold angle, the HMD device 100 may perform the aforementioned calibrations. Herein, the threshold angle may be a critical angle for which the HMD device 100 performs calibration. The threshold angle may be set by the user or the HMD device 100. However, embodiments are not limited thereto. In addition, the threshold angle may be greater than or less than a right angle. In the case that an angle between an extension line of the first marker 250 and an extension line of the second marker 260 is within the threshold angle, the HMD device 100 may perform the aforementioned calibrations. In addition, in the case that an angle between an extension line of the first marker 250 and an extension line of the second marker 260 exceeds the threshold angle, the HMD device 100 may transfer, to the user, feedback indicating that the capture guide frame 220 cannot be displayed. Herein, the feedback may include at least one of visual feedback, audio feedback and tactile feedback. In addition, the HMD device 100 may display an indicator that guides setting of the capture guide frame 220.

In the case that at least one of the first marker 250 and the second marker 260 is positioned outside the viewing angle range of the camera unit 110, the HMD device 100 cannot display the capture guide frame 220. In this case, the HMD device 100 may transfer, to the user, feedback indicating that the capture guide frame 220 cannot be displayed. Herein, the feedback may include at least one of visual feedback, audio feedback and tactile feedback. In addition, the HMD device 100 may display an indicator that guides setting of the capture guide frame 220.

Figure 3A:
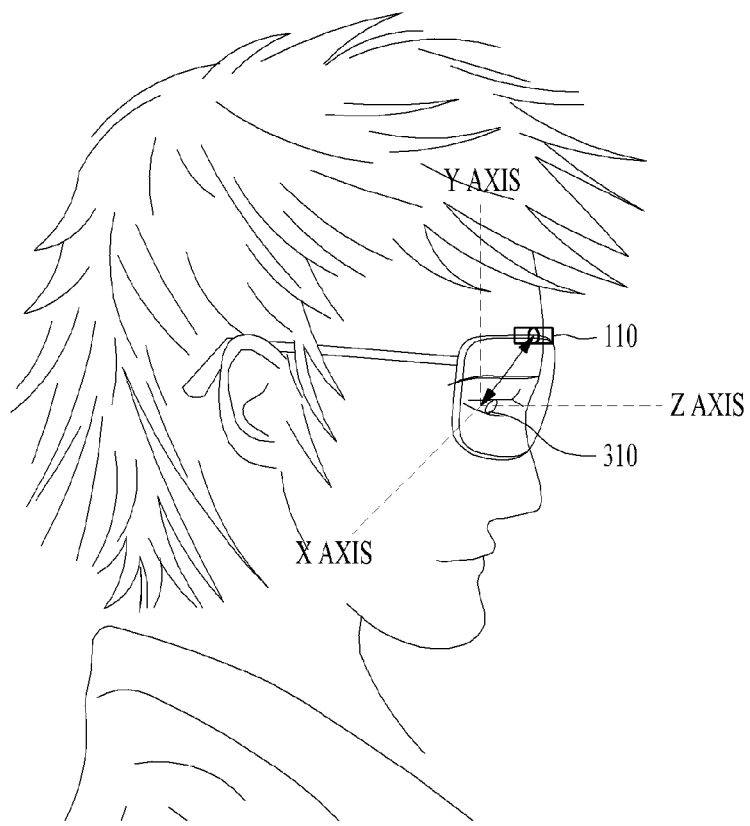

FIGS. 3A and 3B are views illustrating a method for an HMD device 100 to display a capture guide frame based on position information of a camera unit 110 and a user's eye 310 according to one embodiment.

The HMD device 100 may detect a marker, which is a real object, using the camera unit 110. The HMD device 100 may display a capture guide frame 220 based on the detected marker. In addition, the user may detect the marker, which is a real object, using the user's eye 310. At this time, the user may set the capture guide frame 220 based on the marker. The HMD device 100 may detect position information of the camera unit 110 and the user's eye 310. At this time, the camera unit 110 may have a certain distance from the user's eye 310. Accordingly, the capture guide frame 220 set by the HMD device 100 may be different the capture guide frame 220 set by the user.

Referring to FIGS. 3A and 3B, the camera unit 110 may be positioned a certain distance from the user's eye 310. More specifically, the camera unit 110 and the user's eye 310 may not be positioned in the same plane and the same direction. At this time, the camera unit 110 may have an X-axis distance 320, a Y-axis distance 330 and a Z-axis distance 340 from the user's eye 310. The HMD device 100 may be worn by the user as a wearable device, and the camera unit 110 may have a certain distance from the user's eye 310.

At this time, the HMD device 100 may acquire a capture guide frame based on the X-axis distance 320 between the camera unit 110 and the user's eye 310. More specifically, the HMD device 100 may detect the X-axis distance 320 as a distance between the camera unit 110 and the user's eye 310. The HMD device 100 may display the capture guide frame based on the X-axis distance 320. In addition, the HMD device 100 may display the capture guide frame based on the Y-axis distance 330. More specifically, the HMD device 100 may detect the Y-axis distance 330 as a distance between the camera unit 110 and the user's eye 310. The HMD device 100 may display the capture guide frame based on the Y-axis distance 330. In addition, the HMD device 100 may display the capture guide frame based on the Z-axis distance 340. More specifically, the HMD device 100 may detect the Z-axis distance 340 as a distance between the camera unit 110 and the user's eye 310. The HMD device 100 may display the capture guide frame based on the Z-axis distance 340.

In addition, the HMD device 100 may display the capture guide frame using, for example, at least one of the X-axis distance 320, the Y-axis distance 330 and the Z-axis distance 340. More specifically, the HMD device 100 may divide the distance between the camera unit 110 and the user's eye 310 into the X-axis distance 320, the Y-axis distance 330 and the Z-axis distance 340. In this case, the HMD device 100 may acquire capture guide frames based on the respective distances. The HMD device 100 may combine the acquired capture guide frames. The HMD device 100 may display the combined capture guide frame as a final capture guide frame. That is, the HMD device 100 may combine information about the respective distances and display a capture guide frame.

The X-axis distance 320 may, for example, be a distance from the camera unit 110 to the user's eye 310 positioned on the left. In addition, the X-axis distance 320 may be a distance from the camera unit 110 to the user's eye 310 positioned on the right. The Y-axis distance 330 may, for example, be a distance from the camera unit 110 to the user's eye 310 positioned at the upper side. In addition, the Y-axis distance 330 may be a distance from the camera unit 110 to the user's eye 310 positioned at the lower side. In addition, the Z-axis distance 340 may, for example, be a distance from the camera unit 110 to the user's eye 310 positioned in front of the camera unit 110. In addition, the Z-axis distance 320 may be a distance from the camera unit 110 to the user's eye 310 positioned behind the camera unit 110. That is, the distance and direction of the camera unit 110 with respect to the user's eye 310 may vary. In this case, the HMD device 100 may display the capture guide frame according to the distance and direction of the camera unit 110 with respect to the user's eye 310.

Figure 4:
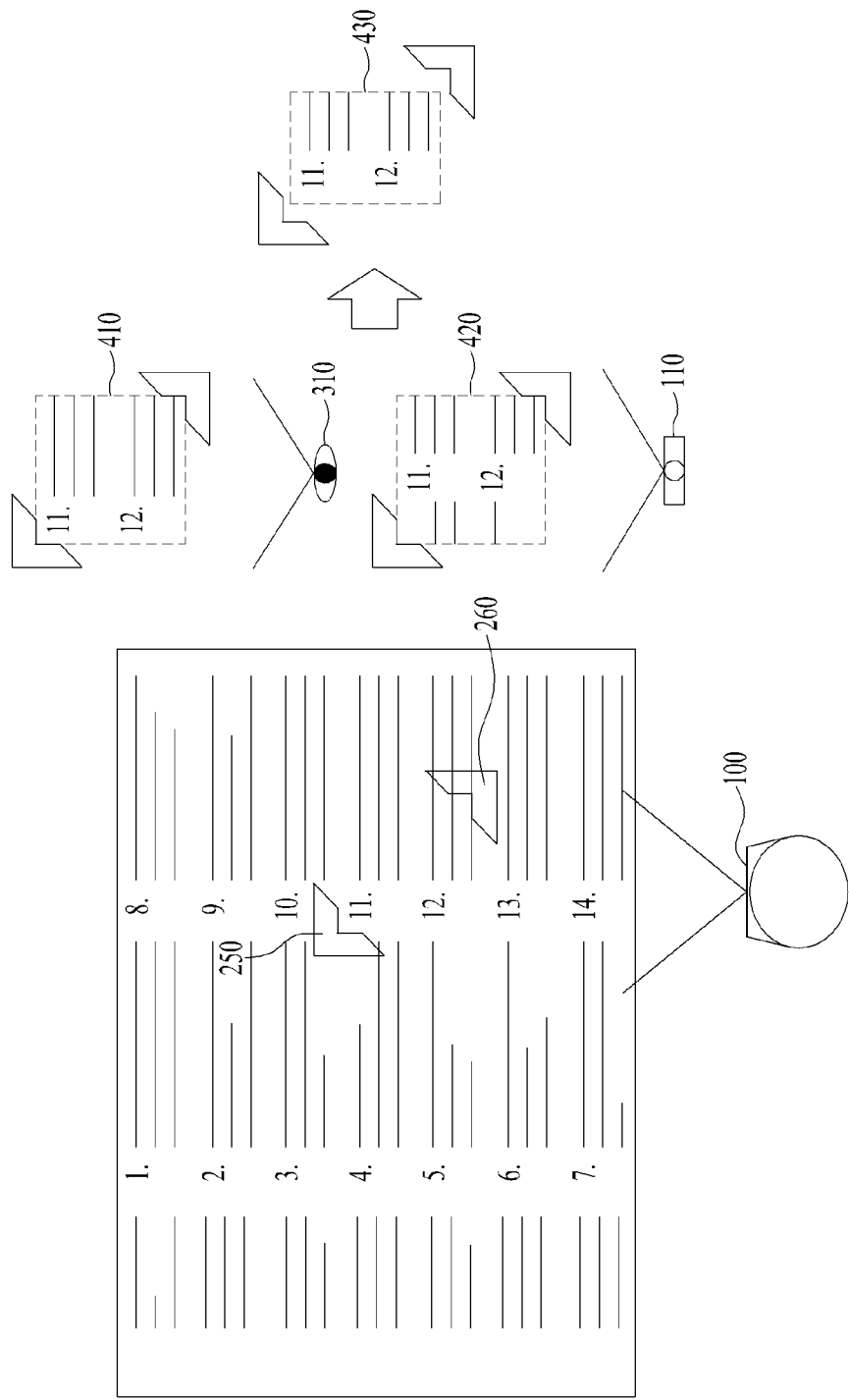
FIG. 4 is a view illustrating a difference between a capture guide frame set with a camera unit by an HMD device and a capture guide frame set with a user's eye by the user, according to one embodiment.

FIG. 4 is a view illustrating a difference between a capture guide frame set with a camera unit 100 by an HMD device 100 and a capture guide frame set with a user's eye by the user, according to one embodiment.

In the case that the HMD device 100 detects a marker, the HMD device 100 may set a capture guide frame in a region different from that of a capture guide frame set by the user. More specifically, the user's eye 310 may detect the first marker 250 and the second marker 260. The HMD device 100 may set a first temporary capture guide frame 410 based on the first marker 250 and second marker 260 detected by the user. The camera unit 110 may detect the first marker 250 and the second marker 260. The HMD device 100 may set a second temporary capture guide frame 420 based on the first marker 250 and second marker 260 detected by the camera unit 110. At this time, the first temporary capture guide frame 410 may be differently set over the second temporary capture guide frame 420 depending upon the position information of the camera unit 110 and the user's eye 310.

Referring to FIG. 4, the user's eye 310 may detect a portion of paragraphs 11 and 12 as the first temporary capture guide frame 410. At this time, the camera unit 110 may detect a portion of paragraphs 11 and 12 and a portion of paragraphs 4 and 5 as the second temporary capture guide frame 420. That is, the second temporary capture guide frame 420 may be a region different from that of the first temporary capture guide frame 410. The HMD device 100 may set an overlap region between the first temporary capture guide frame 410 and the second temporary capture guide frame 420 to be the capture guide frame 430. That is, the HMD device 100 may set only the overlap region between a region detected by the user's eye 310 and a region detected by the camera unit 110 to be the capture guide frame 430. In addition, the HMD device 100 may display the capture guide frame 430.

At this time, the camera unit 110 may fail to detect a portion of a region in the field of the user's vision. That is, the user's eye 310 may detect a region that is not covered by the field of vision of the camera unit 110. In addition, the user's eye 310 may fail to detect a portion of a region in the field of vision of the camera unit 110. That is, the camera unit 110 may detect a portion of a region that is not covered by the field of vision of the user's eye 310. More specifically, in paragraphs 11 and 12 detected by the user's eye 310, the camera unit 110 may fail to detect a portion close to the second marker 260. In addition, the user's eye 310 may fail to detect a portion of paragraphs 4 and 5, which are a region detected by the camera unit 110. Accordingly, the HMD device 100 may set the capture guide frame 430 in a region which both the user's eye 310 and the camera unit 110 can detect and display the same. Thereby, the user may detect a region whose image the user desires to capture and the HMD device 100 may capture the image.

In addition, in the case that the HMD device 100 detects change in angle of the marker, the HMD device 100 may display the capture guide frame based on the detected angle. At this time, the position where the capture guide frame is displayed may be determined based on the angle.

Figure 5A:
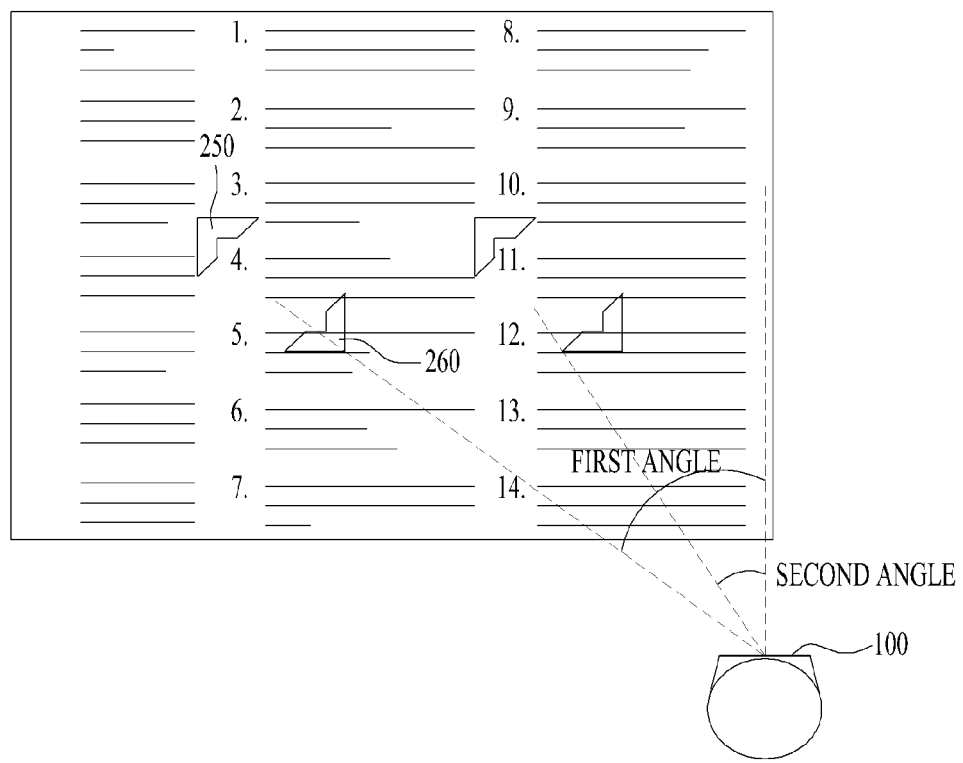
FIGS. 5A to 5C are views illustrating a method for an HMD device to display a capture guide frame based on an angle of a marker when the HMD device detects the marker, according to one embodiment.
Figure 5B:
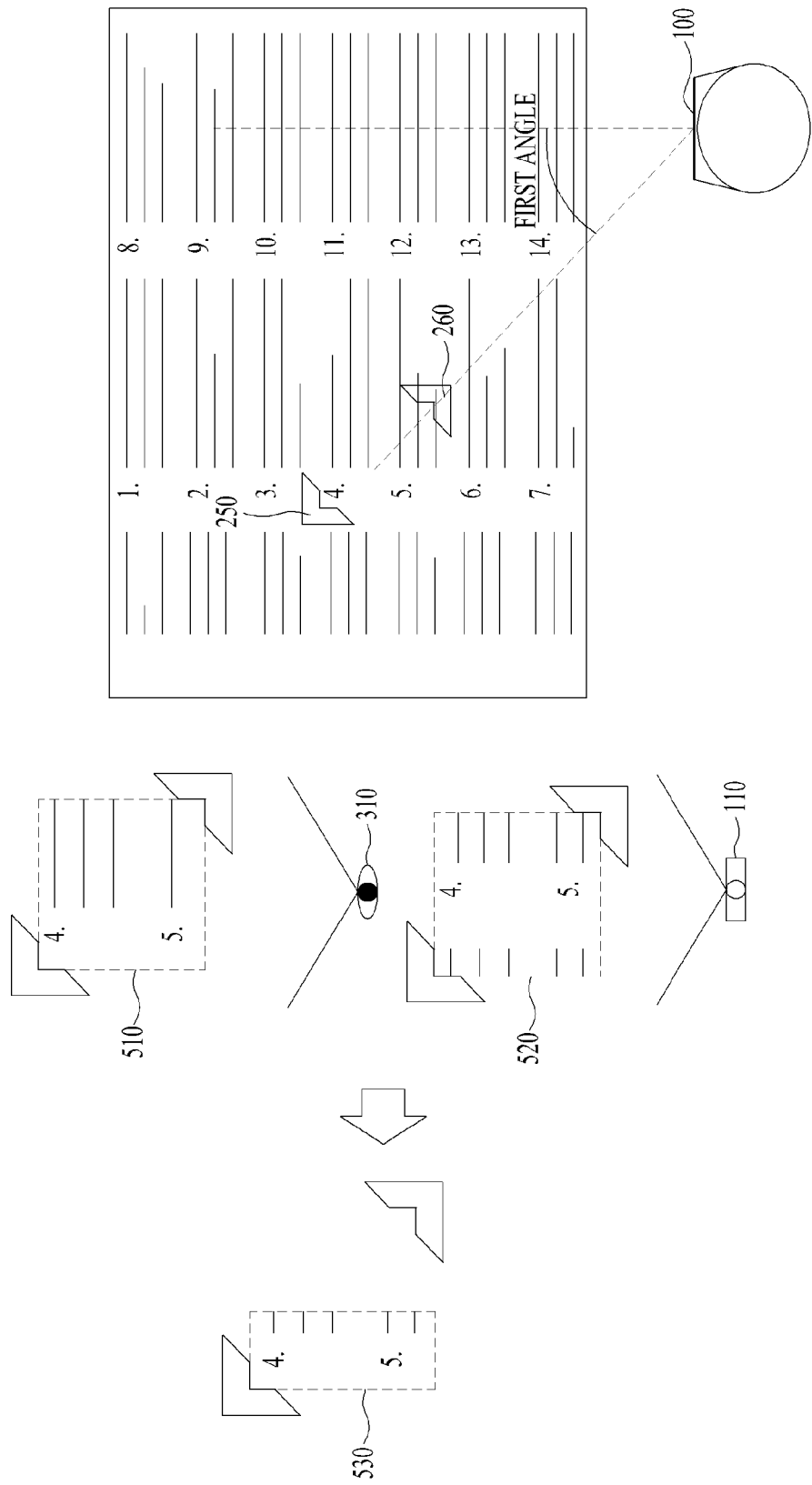
Figure 5C:
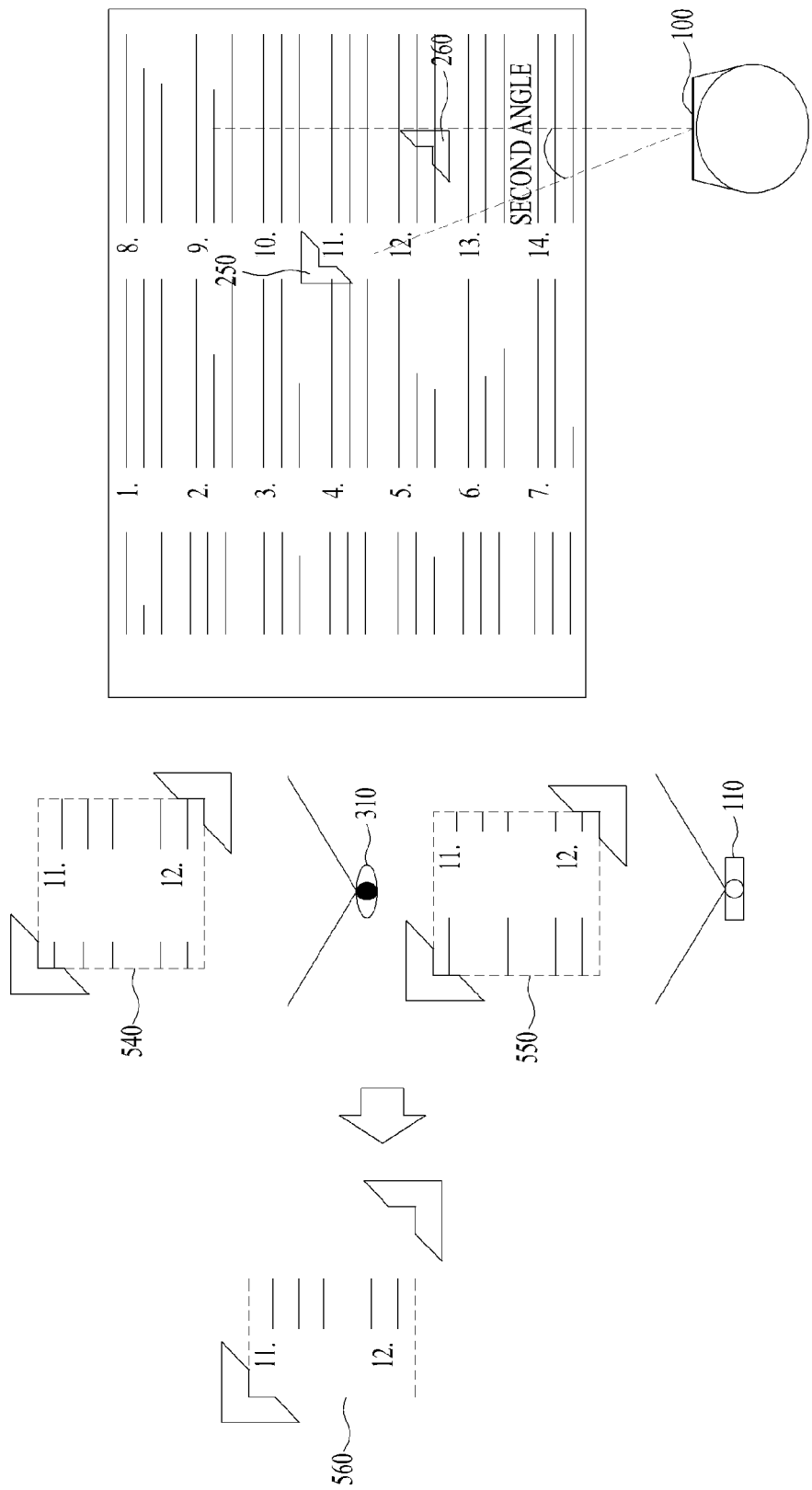

FIGS. 5A to 5C are views illustrating a method for the HMD device 100 to display a capture guide frame based on an angle of a marker when the HMD device detects the marker, according to one embodiment.

The HMD device 100 may display the capture guide frame based on an angle of the marker in relation to the camera unit 110. More specifically, in the case that the angle of the marker in relation to the camera unit 110 increases, the HMD device 100 may set the position of the capture guide frame. Herein, the capture guide frame may be an augmented reality image that indicates a portion of the inner region whose image can be captured by the camera unit 110 according to the user's eye gaze. That is, when the user captures an image of a real object with the HMD device 100, the user may capture an image of the inner region of the capture guide frame that is displayed on the display unit 120 of the HMD device 100.

In addition, in the case that the marker includes a first marker 250 and a second marker 260, the HMD device 100 may detect the angle of the marker in relation to the camera unit 110 based on a center point of the first marker 250 and the second marker 260. Herein, the center of point of the marker may be set by the positions where the first marker 250 and the second marker 260 are detected. More specifically, the center point may be a center point of the inner region between the first marker 250 and the second marker 260. At this time, the HMD device 100 may set the center point of the marker based on the positions of the first marker 250 and the second marker 260. The HMD device 100 may display the center point on, for example, the display unit 120. Thereby, the user may check the center point of the region of an image that is captured. In the case that the marker is, for example, a frame, the HMD device 100 may set a point at the center of the inner region of the frame in the horizontal and vertical directions to be the center point. That is, the center point of the marker may be a point at the center of the inner region of the marker in the direction of horizontal and vertical directions of the marker.

The HMD device 100 may detect the angle of the markers 250 and 260 in relation to the camera unit 110 based on the center point of the markers 250 and 260. Herein, the angle of the markers 250 and 260 in relation to the camera unit 110 may be an angle with respect to a left direction, a right direction, an up direction, and a down direction. In addition, for example, the HMD device 100 may detect position information of the user's eye 310 and an angle of the marker in relation to the user's eye. The HMD device 100 may display a capture guide frame based on the angle of the marker in relation to the user's eye. However, embodiments are not limited thereto.

In the case that the HMD device 100 displays the capture guide frame based on the angle of the markers 250 and 260 in relation to the camera unit 110, when the markers 250 and 260 are detected at a first position forming a first angle, the HMD device 100 may display a first capture guide frame 530 having a first guide position based on the first angle. In addition, when the markers 250 and 260 are detected at a second position forming a second angle, the HMD device 100 may display a second capture guide frame 560 having a second guide position based on the second angle. Herein, in the case that the first angle is greater than the second angle, the first guide position may be located farther from the center point of the markers 250 and 260 than the second guide position. Herein, the first guide position may be a position in the marker where the first capture guide frame 530 is displayed. In addition, the second guide position may be a position in the marker where the second capture guide frame 560 is displayed. More specifically, the HMD device 100 may display the capture guide frame between the markers 250 and 260. At this time, the HMD device 100 may display the capture guide frame based on the center point of the markers 250 and 260. In the case that the HMD device 100 detects that the markers 250 and 260 are positioned in front of the camera unit 110, the HMD device 100 may display the capture guide frame based on the center point of the markers 250 and 260. That is, in the case that the angle of the marker in relation to the camera unit 110 is 0 degree, the HMD device 100 may display the capture guide frame based on the center point of the markers 250 and 260. In the case that the HMD device 100 detects the markers 250 and 260 at a position spaced a certain angle from the front of the camera unit 110 to the right, the HMD device 100 may display the capture guide frame spaced a certain distance from the center point to the right side of the center of point of the markers 250 and 260 based on the angle. In the case that the angle increases, the HMD device 100 may display the capture guide frame at a position located farther from the center point of the marker. That is, when the angle of the detected marker increases, the HMD device 100 may display the capture guide frame at a position located farther from the center point of the marker.

Referring to FIG. 5B, in the case that the markers 250 and 260 have a first angle in relation to the camera unit 110, the HMD device 100 may display the first capture guide frame 530 based on the first angle. At this time, the HMD device 100 may set a first temporary capture guide frame 510 based on the markers 250 and 260 detected by the user's eye 310. Herein, the first temporary capture guide frame 510 may include a portion of paragraphs 4 and 5. The HMD device 100 may set a second temporary capture guide frame 520 based on the markers 250 and 260 detected by the camera unit 110. At this time, the HMD device 100 detects the same markers 250 and 260 as those detected by the user's eye 310, but the second temporary capture guide frame 520 may be set in a region different from that of the first temporary capture guide frame 510 by a difference between the user's eye 310 and the camera unit 110. At this time, the second temporary capture guide frame 520 may be set to be a portion of paragraphs 4 and 5 and a portion of paragraphs positioned on the right side of paragraphs 4 and 5. The HMD device 100 may set an overlap region between the first temporary capture guide frame 510 and the second temporary capture guide frame 520 to be the first capture guide frame 530. Accordingly, the first capture guide frame 530 may be set in a portion having the paragraph numbers of paragraphs 4 and 5. In addition, the first capture guide frame 530 may be displayed at a position spaced apart from the center point of the marker to the right side. That is, in the case that the HMD device 100 displays the first capture guide frame 530, the HMD device 100 may display the region of the first temporary capture guide frame 510 detected by the user's eye except a portion belonging to the second temporary capture guide frame 520, as the first capture guide frame 530. Accordingly, the first capture guide frame 530 may be displayed at a position biased to the right within the markers 250 and 260. At this time, the HMD device 100 may set the center point of the first capture guide frame 530 to be a first guide position. That is, the first guide position may be a middle point between the paragraph numbers 4 and 5 in the first capture guide frame 530.

Referring to FIG. 5C, in the case that the markers 250 and 260 have a second angle in relation to the camera unit 110, the HMD device 100 may display the second capture guide frame 560 based on the second angle. At this time, the HMD device 100 may set a first temporary capture guide frame 540 based on the markers 250 and 260 detected by the user's eye 310. The first temporary capture guide frame 540 may include a portion of paragraphs 11 and 12. The HMD device 100 may set a second temporary capture guide frame 550 based on the markers 250 and 260 detected by the camera unit 110. At this time, the HMD device 100 may detect the same markers 250 and 260 as those detected by the user's eye 310, but the second temporary capture guide frame 550 may be set in a region different from that of the first temporary capture guide frame 540 due to a difference between the user's eye 310 and the camera unit 110. At this time, the second temporary capture guide frame 550 may be set to be a portion of paragraphs 11 and 12 and a portion of paragraphs positioned on the right side of paragraphs 11 and 12. The HMD device 100 may set an overlap region between the first temporary capture guide frame 540 and the second temporary capture guide frame 550 to be the second capture guide frame 560. Accordingly, the second capture guide frame 560 may be set to a portion of the region of paragraphs 11 and 12. In addition, the second capture guide frame 560 may be displayed at a position spaced apart from the center point of the marker to the right side. That is, in the case that the HMD device 100 displays the second capture guide frame 560, the HMD device 100 may display the region of the first temporary capture guide frame 540 detected by the user's eye except a portion belonging to the second temporary capture guide frame 550, as the second capture guide frame 560. At this time, the HMD device 100 may set the center point of the second capture guide frame 560 to be a second guide position. That is, the second guide position may be the middle point between paragraphs 11 and 12.

In the case that the first angle is greater than the second angle, the first guide position may be displayed at a position located farther from the center point of the markers 250 and 260 than the second guide position. More specifically, in the case that the first angle is greater than the second angle, the difference in the region set by comparing the second temporary capture guide frames 520 and 550 with the first temporary capture guide frames 510 and 540 may increase. Accordingly, the first capture guide frame 530 may be positioned farther to the right side of the center of point of the markers 250 and 260 than the second capture guide frame 560. That is, the first guide position may be positioned father away from the center of point of the markers 250 and 260 than the second guide position.

In addition, in the case that the HMD device 100 displays the capture guide frame based on the angle of the markers 250 and 260 in relation to the camera unit 110, when the markers 250 and 260 are detected at a first position having the first angle, the HMD device 100 may display the first capture guide frame 530 having a first size based on the first angle. In addition, when the markers 250 and 260 are detected at a second position having the second angle, the HMD device 100 may display the second capture guide frame 560 having a second size based on the second angle. In the case that the first angle is greater than the second angle, the first size may be less than the second size. More specifically, the camera unit 110 may detect the markers 250 and 260. At this time, the HMD device 100 may set the first temporary capture guide frame 510 based on the angle of the markers 250 and 260 detected by the camera unit 110. In addition, the user's eye 310 may detect the markers 250 and 260. At this time, the HMD device 100 may set the second temporary capture guide frame 520 based on the markers 250 and 260 detected by the user's eye 310. At this time, the first temporary capture guide frame 510 may be set in a region different from that of the second temporary capture guide frame 520 due to the distance between the camera unit 110 and the user's eye 310. The HMD device 100 may set an overlap region between the first capture guide frame 510 and the second capture guide frame 520 to be the first capture guide frame 530.

At this time, in the case that the HMD device 100 detects that the markers 250 and 260 are positioned in front of the camera unit 110, the HMD device 100 may display the first temporary capture guide frame 510 and the second temporary capture guide frame 520 at the same position to have the same size. That is, in the case that the angle of the marker in relation to the camera unit 110 is 0 degrees, the size of the first capture guide frame 530 may be equal to that of the first temporary capture guide frame 510. In the case that the HMD device 100 detects the markers 250 and 260 at a position spaced a certain angle from the front of the camera unit 110 to the right, the HMD device 100 may set the first temporary capture guide frame 510 and the second temporary capture guide frame 520 based on the angle. At this time, the first temporary capture guide frame 510 may be set in a region different from that of the second temporary capture guide frame 520 due to the angle. In the case that the angle increases, the different between the set regions of the first temporary capture guide frame 510 and the second temporary capture guide frame 520 may increase. That is, in the case that the angle of the marker detected by the HMD device 100 increases, the overlap region between the first temporary capture guide frame 510 and the second temporary capture guide frame 520 may become smaller. Accordingly, in the case that the angle of the markers 250 and 260 in relation to the camera unit 110 increases, the HMD device 100 may display the first capture guide frame with a smaller size.

Thereby, after the user sets a portion whose image the user desires to capture, the HMD device 100 may calibrate a difference produced by the difference in position between the user's eye 310 and the camera unit 110.

Figure 6A:
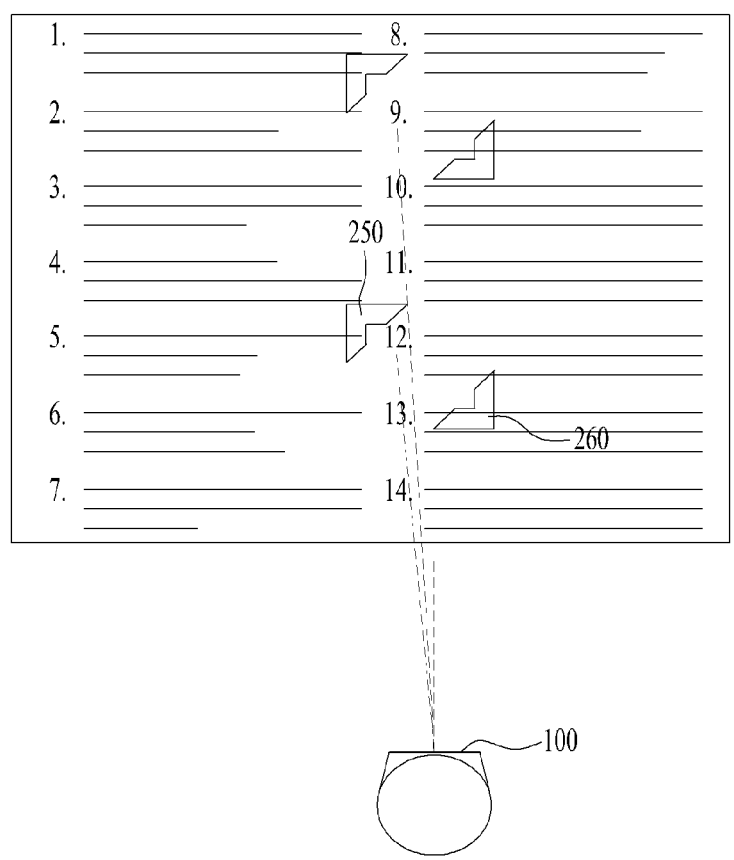
Figure 6B:
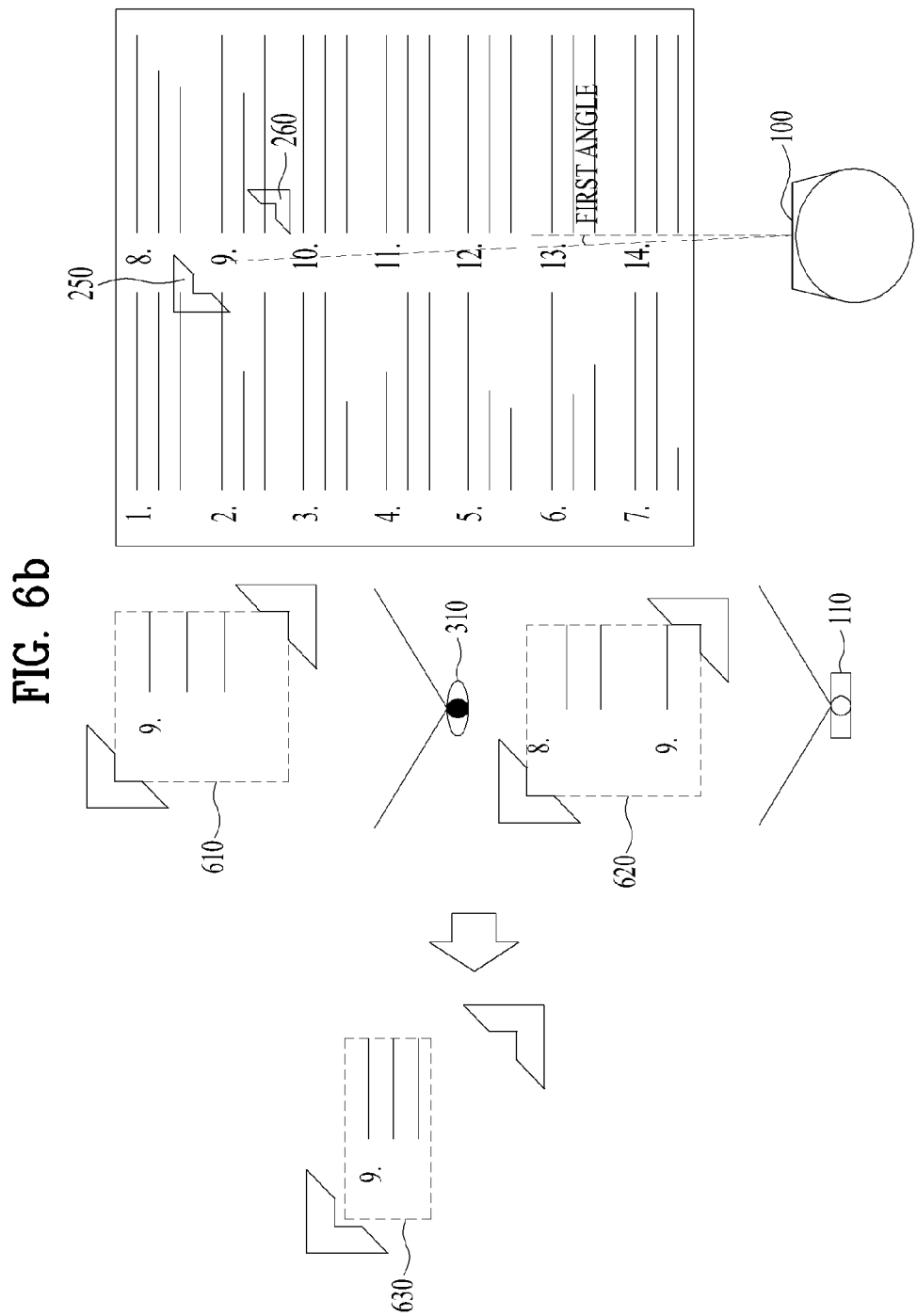

FIGS. 6A to 6C are views illustrating a method for an HMD device 100 to display a capture guide frame based on an angle of a marker when the HMD device 100 detects the marker, according to one embodiment.

The HMD device 100 may display a capture guide frame based on the angle of the markers 250 and 260 in relation to the camera unit 110. At this time, the HMD device 100 may set the angle of the markers 250 and 260 in relation to the camera unit 110 with respect to a right direction, an up direction, and a down direction. That is, the markers 250 and 260 may be positioned by being shifted to the upper side, lower side, left side and right side with respect to the front of the camera unit 110.

For example the HMD device 100 may detect that the markers 250 and 260 are positioned at the upper side of the camera unit 110.

At this time, as exemplarily illustrated in FIG. 6B, in the case that the markers 250 and 260 has a first angle in relation to the camera unit 110, the HMD device 100 may display the first capture guide frame 630 based on the first angle. At this time, the HMD device 100 may set a first temporary capture guide frame 610 based on the markers 250 and 260 detected by the user's eye 310. Herein, the first temporary capture guide frame 610 include a portion of content of paragraph 9. The HMD device 100 may set a second temporary capture guide frame 620 based on the markers 250 and 260 detected by the camera unit 110. At this time, the HMD device 100 may detect the same markers 250 and 260 as detected by the user's eye 310, but the second temporary capture guide frame 620 may be set in a region different from that of the first temporary capture guide frame 610 by a difference between the user's eye 310 and the camera unit 110. At this time, the second temporary capture guide frame 620 may be set to be a portion of the content of paragraphs 8 and 9. The HMD device 100 may set an overlap region between the first temporary capture guide frame 610 and the second temporary capture guide frame 620 to be a first capture guide frame 630. Accordingly, the first capture guide frame 630 may be set to be a region having the paragraph number of paragraph 9 and a portion of the paragraph. In addition, the first capture guide frame 530 may be displayed at a position spaced apart from the center point of the marker to the upper side. That is, in the case that the HMD device 100 displays the first capture guide frame 630, the HMD device 100 may display the region of the first temporary capture guide frame 610 detected by the user's eye except a portion belonging to the second temporary capture guide frame 620, as the first capture guide frame 630. Accordingly, the first capture guide frame 630 may be displayed at a position biased to the upper side within the markers 250 and 260. At this time, the HMD device 100 may set the center point of the first capture guide frame 630 to be a first guide position.

Referring to FIG. 6C, in the case that the markers 250 and 260 have a second angle in relation to the camera unit 110, the HMD device 100 may display the second capture guide frame 660 based on the second angle. At this time, the HMD device 100 may set a first temporary capture guide frame 640 based on the markers 250 and 260 detected by the user's eye 310. The first temporary capture guide frame 640 may include a portion of the content of paragraph 12. The HMD device 100 may set a second temporary capture guide frame 650 based on the markers 250 and 260 detected by the camera unit 110. At this time, the HMD device 100 may detect the same markers 250 and 260 as detected by the user's eye 310, but the second temporary capture guide frame 650 may be set in a region different from that of the first temporary capture guide frame 640 due to a difference between the user's eye 310 and the camera unit 110. At this time, the second temporary capture guide frame 650 may be set to be a region of a portion of the content of paragraphs 11 and 12. The HMD device 100 may set an overlap region between the first temporary capture guide frame 640 and the second temporary capture guide frame 650 to be the second capture guide frame 660. Accordingly, the second capture guide frame 660 may be set to a region having the paragraph number of paragraph 12 and a portion of paragraph 12. In addition, the second capture guide frame 660 may be displayed at a position spaced apart from the center point of the marker to the upper side. At this time, the HMD device 100 may set the center point of the second capture guide frame 660 to be a second guide position.

In the case that the first angle is greater than the second angle, the first guide position may be displayed at a position farther apart from the center point of the markers 250 and 260 than the second guide position. More specifically, in the case that the first angle is greater than the second angle, the difference in the region set by comparing the second temporary capture guide frames 520 and 550 with the first temporary capture guide frames 510 and 540 may increase. Accordingly, the first guide position may be positioned father to the upper side of the center of point of the markers 250 and 260 than the second guide position. That is, the first guide position may be positioned father to the upper side of the center of point of the markers 250 and 260 than the second guide position.

Figure 7A:
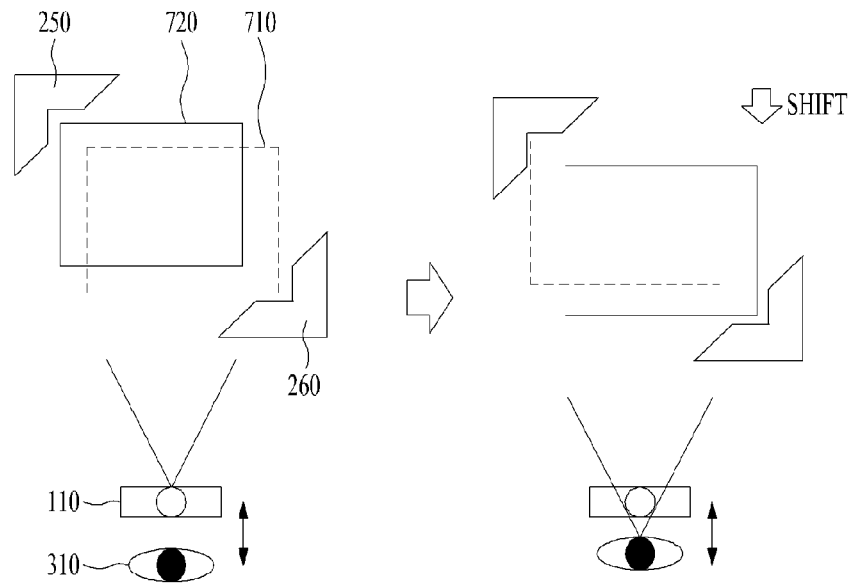
FIGS. 7A and 7B are views illustrating a capture guide frame determined by an angle of a marker in relation to a camera unit, according to one embodiment.
Figure 7B:
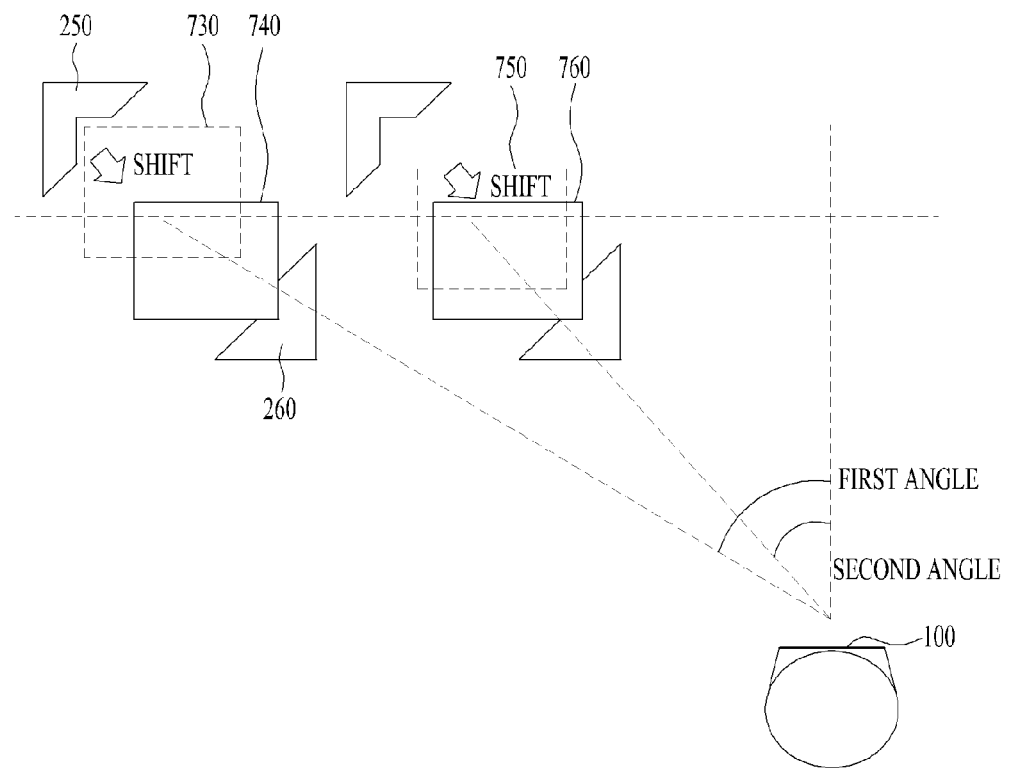

FIGS. 7A and 7B are views illustrating a capture guide frame determined by the angle of a marker in relation to a camera unit, according to one embodiment.

Referring to FIGS. 7A and 7B, the HMD device 100 may adjust the sizes of a first temporary capture guide frame 710 and a second temporary capture guide frame 720. More specifically, the HMD device 100 may adjust the sizes of the first temporary capture guide frame 710 and the second temporary capture guide frame 720 in the inner region of the markers 250 and 260. In the case that the sizes of the first temporary capture guide frame 710 and the second temporary capture guide frame 720 are reduced, the first temporary capture guide frame 710 and the second temporary capture guide frame 720 may be positioned between the markers 250 and 260. At this time, the field of vision of the camera unit 110 may cover the entire region of the first temporary capture guide frame 710. In addition, the field of vision of the user's eye 310 may cover the entire region of the second temporary capture guide frame 720. That is, in the case that both the first temporary capture guide frame 710 and the second temporary capture guide frame 720 are set between the markers 250 and 260, the camera unit 110 and the user's eye 310 may detect all the regions of the first temporary capture guide frame 710 and the second temporary capture guide frame 720.

At this time, the HMD device 100 may set the first temporary capture guide frame 710 to be the capture guide frame. More specifically, the HMD device 100 may detect the entirety of the first temporary capture guide frame 710 that the field of vision of the user's eye 310 covers. The HMD device 100 may shift the second temporary capture guide frame 720 acquired with the camera unit 110 to the position of the first temporary capture guide frame 710 and set the first temporary capture guide frame 710 to be the capture guide frame. Accordingly, the capture guide frame may be set to the first temporary capture guide frame 710 excluding the overlap region. Thereby, the user may acquire a capture image for a region identical to the region detected with the user's eye 310.

At this time, in the case that the angle of the markers 250 and 260 in relation to the camera unit 110 increases, the second temporary capture guide frame 720 may be set at a position father apart from the first temporary capture guide frame 710. That is, the HMD device 100 may acquire the first temporary capture guide frame 710 by further moving the second temporary capture guide frame 720 and display the first temporary capture guide frame 710 as the capture guide frame. For example, in the case that the angle of the markers 250 and 260 in relation to the camera unit 110 increases, the field of vision of the user may not cover a portion of the region of the second temporary capture guide frame 720. In this case, the HMD device 100 may set an overlap region between the first temporary capture guide frame 710 and the second temporary capture guide frame 720 to be a capture guide frame. In addition, the HMD device 100 may, for example, transfer, to the user, feedback indicating that the second temporary capture guide frame 720 is set at a position out of the field of the user's vision. Herein, the feedback may include at least one of visual feedback, audio feedback and tactile feedback.

In addition, the HMD device 100 may, for example, display the first temporary capture guide frame 710 and the second temporary capture guide frame 720. At this time, the user set and display the capture guide frame through the displayed first temporary capture guide frame 710 and second temporary capture guide frame 720. Thereby, the user may control a capturable region.

Figure 8A:
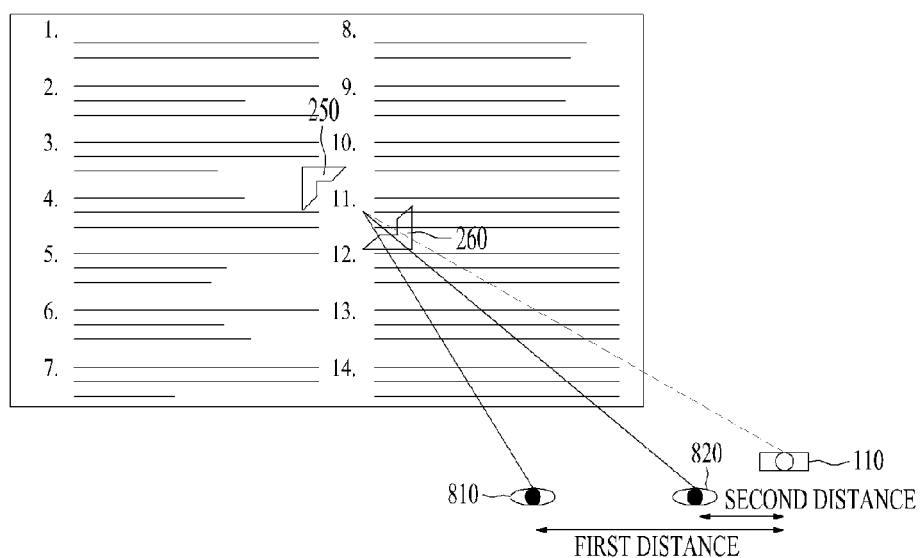
Figure 8C:
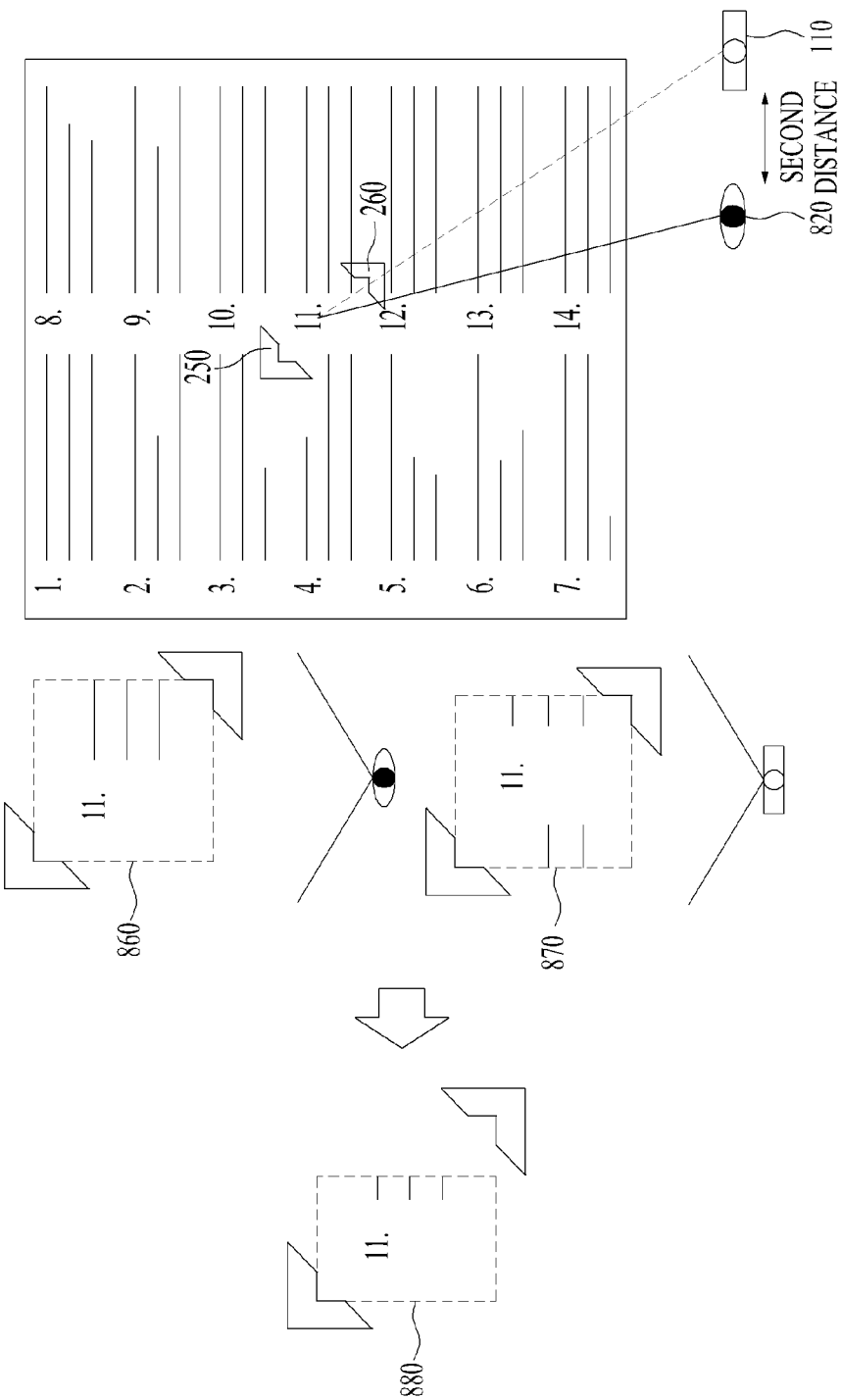

FIGS. 8A to 8C are views illustrating a method for setting a capture guide frame based on a camera unit 110 and a user's two eyes according to one embodiment.

The HMD device 100 may display the capture guide frame based on the user's eyes and the camera unit 110. At this time, the HMD device 100 may acquire and display a first capture guide frame 850 based on one eye 810 (hereinafter, a first eye) of the user's two eyes positioned farther from the camera unit 110. In addition, the HMD device 100 may acquire and display a second capture guide frame 880 based on the other eye 820 (hereinafter, a second eye) of the user's two eyes positioned closer to the camera unit 110.

More specifically, the HMD device 100 may detect the markers 250 and 260 and set a first temporary capture guide frame 830, based on the first eye 810. In addition, the HMD device 100 may detect the markers 250 and 260 and set a second temporary capture guide frame 840, based on the camera unit 110. The HMD device 100 may set an overlap region between the first temporary capture guide frame 830 and the second temporary capture guide frame 840 to be the first capture guide frame 850. At this time, the HMD device 100 may set the center point of the first capture guide frame 850 to be a first guide position. More specifically, the first capture guide frame 850 may be a portion of the region of the first temporary capture guide frame 830 that overlaps the second temporary capture guide frame 840. Accordingly, the first capture guide frame may only display a blank region and the number "1" from a portion including the paragraph number. At this time, the first guide position may be spaced apart from the center of point of the markers 250 and 260 to the right.

In addition, the HMD device 100 may display the second capture guide frame 880 based on a second distance, which is a distance between the camera unit 110 and the second eye 820. More specifically, the HMD device 100 may detect the markers 250 and 260 and set a first temporary capture guide frame 860, based on the second eye 820. In addition, the HMD device 100 may detect the markers 250 and 260 and set a second temporary capture guide frame 870, based on the camera unit 110. The HMD device 100 may set an overlap region between the first temporary capture guide frame 860 and the second temporary capture guide frame 870 to be the second capture guide frame 880. At this time, the HMD device 100 may set the center point of the second capture guide frame 880 to be a second guide position. That is, the HMD device 100 may display the second capture guide frame 880 based on the second guide position. More specifically, the second capture guide frame 880 may be a portion of the region of the first temporary capture guide frame 860 that overlaps the second temporary capture guide frame 870. Herein, the second guide position may be a position spaced apart from the center point to the right.

In the case that the first distance is greater than the second distance, the first guide position may be displayed at a position spaced farther away from the center of point of the markers 250 and 260 than the second guide position. More specifically, in the case that the first distance is greater than the second distance, the difference in region set by comparing the second temporary capture guide frames 840 and 870 with the first temporary capture guide frames 830 and 880 may increase. Accordingly, the first guide position may be positioned farther to the right from the center of point of the markers 250 and 260 than the second guide position. That is, the first guide position may be positioned farther from the center of point of the markers 250 and 260 than the second guide position.

FIGS. 9A to 9C are views illustrating a method for an HMD device to display a capture guide frame based on a distance between a camera unit 110 and markers 250 and 260 according to one embodiment.

The HMD device 100 may display the capture guide frame based on a distance between the camera unit 110 and the markers 250 and 260. In the case that the HMD device 100 detects the markers 250 and 260 at a first position having a first distance, the HMD device 100 may display a first capture guide frame 930 having a first size. In addition, in the case that the HMD device 100 detects the markers 250 and 260 at a second position having a second distance, the HMD device 100 may display a second capture guide frame 960 having a second size. In the case that the first distance is greater than the second distance, the HMD device 100 may set the first size of the first capture guide frame 930 to be greater than the second size of the second capture guide frame 960. Herein, the first distance and second distance may be distances between the camera unit 110 and the markers.

Referring to FIG. 9B, the HMD device 100 may detect the markers 250 and 260 at the first position spaced the first distance from the camera unit 110. At this time, the HMD device 100 may set a first temporary capture guide frame 910 based on the user's eye 310. In addition, the HMD device 100 may detect the markers 250 and 260 at the first position spaced the first distance from the camera unit 110, based on the camera unit 110. At this time, the HMD device 100 may set a second temporary capture guide frame 920 based on the camera unit 110. The first capture guide frame 930 may be an overlap region between the first temporary capture guide frame 910 and the second temporary capture guide frame 920.

Referring to FIG. 9C, the HMD device 100 may detect the markers 250 and 260 at the second position spaced the second distance from the camera unit 110 based on the user's eye 310. At this time, the HMD device 100 may set a first temporary capture guide frame 940 based on the user's eye 310. In addition, the HMD device 100 may detect the markers 250 and 260 at the second position spaced the second distance from the camera unit 110, based on the camera unit 110. At this time, the HMD device 100 may set a second temporary capture guide frame 950 based on the camera unit 110. The first capture guide frame 960 may be an overlap region between the first temporary capture guide frame 940 and the second temporary capture guide frame 950.

In the case that the first distance is greater than the second distance, the first size may be greater than the second size. More specifically, the HMD device 100 may display the first capture guide frame 930 having a greater size than the second capture guide frame 960. The first capture guide frame 930 and the second capture guide frame 960 may be overlap regions between the first temporary capture guide frames 910 and 940 and the second temporary capture guide frames 920 and 950.

At this time, the first temporary capture guide frames 910 and 940 may be set based on the user's eye 310, as described above. In addition, the second temporary capture guide frames 920 and 950 may be set based on the camera unit 110. Accordingly, in the case that the distance between the camera unit 110 and the user's eye 310 increases, the difference in set region between the first temporary capture guide frames 910 and 940 and the second temporary capture guide frames 920 and 950 may increase. At this time, in the case that the distance between the camera unit 110 and the markers 250 and 260 increases, the distance between the camera unit 110 and the user's eye 310 may relatively decrease. That is, in the case that the distance between the camera unit 110 and the marker, the difference in set region between the first temporary capture guide frames 910 and 940 and the second temporary capture guide frames 920 and 950 may decrease.

Accordingly, in the case that the first distance is greater than the second distance, the first capture guide frame 930 is displayed with a greater size than the second capture guide frame 960. More specifically, the first capture guide frame includes a larger portion of the overlap region than the second capture guide frame, and thus the first capture guide frame may be displayed with a larger size than the second capture guide frame.

In addition, the HMD device 100 may, for example, display the capture guide frame based on the distance between the camera unit 110 and the markers 250 and 260. In the case that the HMD device 100 detects the markers 250 and 260 at a first position having a first distance, the HMD device 100 may set the center point of the first capture guide frame 930 to be the first guide position. In the case that the HMD device 100 detects the markers 250 and 260 at a second position having a second distance, the HMD device 100 may set the center point of the second capture guide frame 960 to be the second guide position. In the case that the first distance is greater than the second distance, the first guide position of the first capture guide frame 930 may be closer to the center of point of the markers 250 and 260 than the second guide position of the second capture guide frame 960. Herein, the first distance and second distance may be distances between the camera unit 110 and the markers 250 and 260. That is, the first capture guide frame 930 may be displayed based on the first guide position. In addition, the second capture guide frame 960 may be displayed based on the second guide position.

In the case that the distance between the camera unit 110 and the markers 250 and 260 increases, the difference in region set by comparing the first temporary capture guide frames 910 and 940 with the second temporary capture guide frames 920 and 950 may decrease. Accordingly, in the case that the first distance is greater than the second distance, the first guide position may be closer to the center of point of the markers 250 and 260 than the second guide position.

FIG. 10 is a flowchart illustrating a method for an HMD device 100 to display a capture guide frame based on an angle of a marker in relation to a camera unit 110, according to one embodiment.

The HMD device 100 may detect a marker at a first position having a first angle in relation to the camera unit 110 (S1010). At this time, as illustrated in FIGS. 5A to 5C, the marker may include a first marker and a second marker. In this case, the HMD device 100 may detect the angle of the marker in relation to the camera unit 110, based on the center point of the first marker and the second marker. At this time, the center point of the marker may be set by the positions where the first marker and the second marker are detected. More specifically, the center point of the marker may be the center point of the inner region between the first marker and the second marker. In this case, the HMD device 100 may set the center point of the marker based on the positions of the first marker and the second marker. In addition, for example, the HMD device 100 may display the center point of the marker with the display unit. In addition, in the case that the marker is, for example, a frame, the HMD device 100 may set the center point of the marker at a point in the inner region of the frame that is at the center in the horizontal direction and vertical direction. That is, the center point of the marker may be a position in the inner region of the marker positioned at the center in the horizontal and vertical directions.

In addition, the HMD device 100 may detect the angle of the marker in relation to the camera unit 110 based on the center point of the marker. Herein, the angle of the marker in relation to the camera unit 110 may be an angle with respect to one of an up direction, a down direction a left direction, and a right direction. In addition, the HMD device 100 may acquire the position information of the user's eye 310 and detect an angle of the marker in relation to the user's eye. The HMD device 100 may a capture guide frame based on the angle of the marker in relation to the user's eye. However, embodiments are not limited thereto.

Next, the HMD device 100 may display a first capture guide frame having a first guide position based on the first position of the marker (S1020). Herein, the first guide position may be a position where the first capture guide frame is displayed in the marker, as illustrated in FIGS. 5A to 5C. More specifically, the HMD device 100 may display the capture guide frame in the marker. In this case, the HMD device 100 may display the capture guide frame based on the center point of the marker. In the case that the HMD device 100 detects that the marker is positioned in front of the camera unit 110, the HMD device 100 may display the capture guide frame at the center point of the marker. That is, in the case that the angle of the marker in relation to the camera unit 110 is 0 degrees, the HMD device 100 may display the capture guide frame based on the center point of the marker. In the case that the HMD device 100 detects the marker at a position spaced a certain angle from the front of the camera unit 110 to the right, the HMD device 100 may display the capture guide frame at a position spaced a certain distance from the center point of the marker to the right based on the angle. That is, the first guide position may represent a position in the marker where the first capture guide frame is displayed.

Next, the HMD device 100 may detect increase or decrease of the first angle (S1030). In this case, the HMD device 100 may detect the varying angle and display the capture guide frame based on the detected angle, as illustrated in FIG. 4. At this time, the position to display the capture guide frame may be determined based on the angle.

Next, in the case that the HMD device 100 detects increase of the first angle, the HMD device 100 may set a first guide position to be farther away from the center point of the marker (S1040). Herein, the first guide position may be the center point of the first capture guide frame. That is, the HMD device 100 may display the first capture guide frame based on the first guide position. In the case that the HMD device 100 detects decrease of the first angle, the HMD device 100 may set the first guide position to be close to the center point of the marker (S1050).

At this time, as illustrated in FIGS. 5A to 5C, the HMD device 100 may set the first temporary capture guide frame based on the marker detected by the user's eye 310. The HMD device 100 may set the second temporary capture guide frame based on the marker detected by the camera unit 110. At this time, the HMD device 100 detects the same maker, but the second temporary capture guide frame may be set in a region different from that of the first temporary capture guide frame due to the difference between the user's eye 310 and the camera unit 110. In this case, the HMD device 100 may set an overlap region between the first temporary capture guide frame and the second temporary capture guide frame to be the first capture guide frame. At this time, in the case that the first angle increases, the difference in set region between the first temporary capture guide frame and the second temporary capture guide frame may increase. Accordingly, in the case that the first angle increases, the first capture guide frame may be displayed at a position far apart from the center point of the marker. That is, the first guide position may be far apart from the center point of the marker. In addition, in the case that the first angle increases, the size of the first capture guide frame decrease. On the other hand, in the case the first angle decreases, the difference in set region between the first temporary capture guide frame and the second temporary capture guide frame may decrease. Accordingly, in the case the first angle decreases, the first capture guide frame may be displayed at a position close to the center point of the marker. That is, the first guide position may be close to the center point of the marker. In addition, in the case the first angle decreases, the size of the first capture guide frame may increase.

Figure 11:
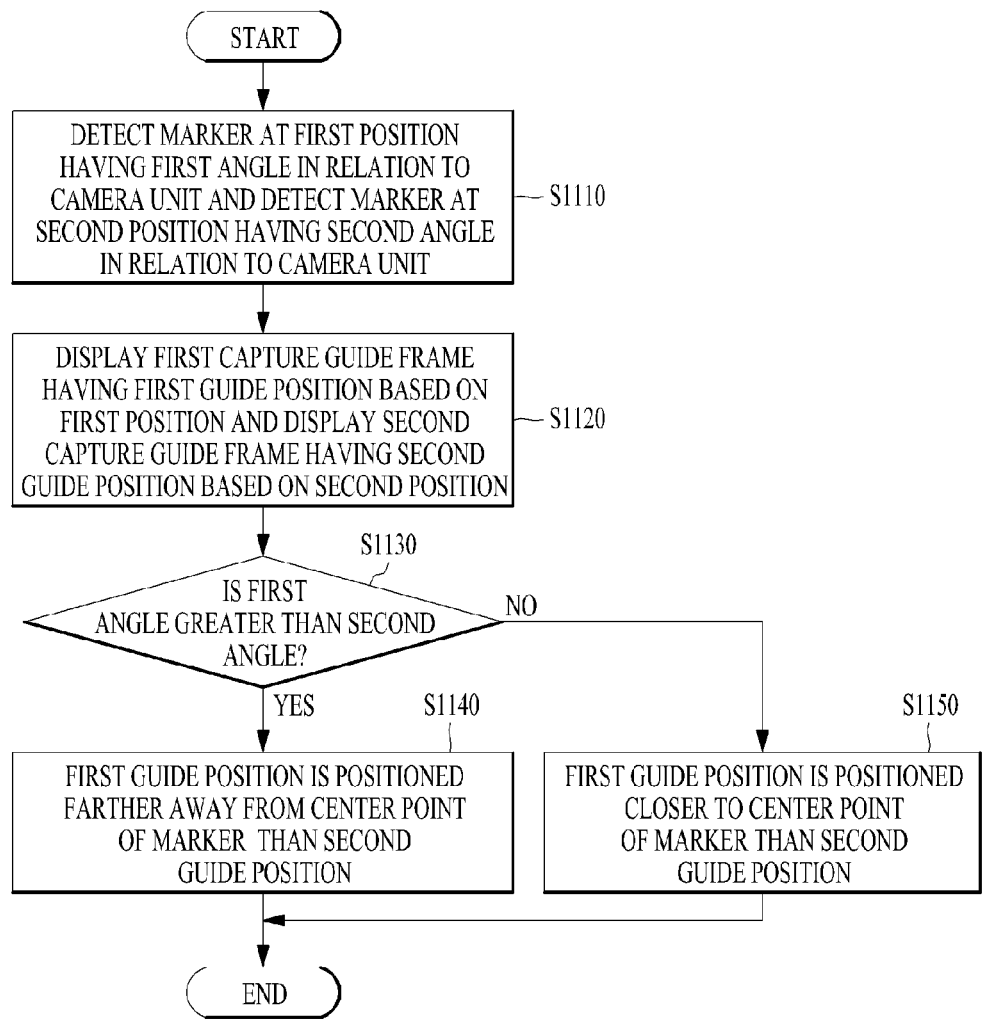
FIG. 11 is a flowchart illustrating a method for an HMD device to control the position of a capture guide frame based on a camera unit and an angle of a marker, according to one embodiment.

FIG. 11 is a flowchart illustrating a method for an HMD device 100 to control the position of a capture guide frame displayed based on an angle of a marker in relation to a camera unit 110, according to one embodiment.

The HMD device 100 may detect a marker at a first position having a first angle in relation to the camera unit 110. In addition, the HMD device 100 may detect the marker at a second position having a second angle in relation to the camera unit 110 (S1110). Herein, the marker may include a first marker and a second marker, as illustrated in FIGS. 5A to 5C. The HMD device 100 may detect the angle of the marker in relation to the camera unit 110 based on the center point of the first marker and the second marker. At this time, the center point of the marker may be set by the positions where the first marker and the second marker are detected. More specifically, the center point of the marker may be the center point of the inner region between the first marker and the second marker.

In this case, the HMD device 100 may set the center point of the marker based on the positions of the first marker and the second marker. In addition, for example, the HMD device 100 may display the center point of the marker with the display unit. In addition, in the case that the marker is, for example, a frame, the HMD device 100 may set the center point of the marker at a point in the inner region of the frame that is at the center in the horizontal direction and vertical direction. That is, the center point of the marker may be a position in the inner region of the marker positioned at the center in the horizontal and vertical directions.

In addition, the HMD device 100 may detect the angle of the marker in relation to the camera unit 110 based on the center point of the marker. Herein, the angle of the marker in relation to the camera unit 110 may be an angle with respect to one of an up direction, a down direction a left direction, and a right direction. In addition, for example, the HMD device 100 may detect the position of the user's eye and also detect the angle of the marker in relation to the user's eye. The HMD device 100 may display the capture guide frame based on the angle of the marker in relation to the user's eye. However, embodiments are not limited thereto.

The HMD device 100 may display a first capture guide frame having a first guide position based on the first position. In addition, the HMD device 100 may display a second capture guide frame having a second guide position based on the second position (S1120). At this time, the HMD device 100 may set the center point of the first capture guide frame to be the first guide position, as illustrated in FIGS. 5A to 5C. The HMD device 100 may set the center point of the second capture guide frame to be the second guide position.

More specifically, the HMD device 100 may display the capture guide frame in the marker. At this time, the HMD device 100 may display the capture guide frame based on the center point of the marker. In the case that the HMD device 100 detects that the marker is positioned in front of the camera unit 110, the HMD device 100 may display the capture guide frame at the center point of the marker. That is, in the case that the angle of the marker in relation to the camera unit 110 is 0 degrees, the HMD device 100 may display the capture guide frame based on the center point of the marker. In the case that the HMD device 100 detects the marker at a position spaced a certain angle from the front of the camera unit 110, the HMD device 100 may display the capture guide frame at a position spaced a certain distance from the center point of the marker based on the angle.

The HMD device 100 may detect the magnitudes of the first angle and second angle (S1130). In the case that the first angle is greater than the second angle, the first guide position may be located at a point farther away from the center point than the second guide position (S1140). On the other hand, in the case the first angle is less than the second angle, the first guide position may be located at a point close to the center point than the second guide position (S1150). At this time, as illustrated in FIGS. 5A to 5C, the HMD device 100 may set the first temporary capture guide frame based on the marker detected by the user's eye 310. The HMD device 100 may set the second temporary capture guide frame based on the marker detected by the camera unit 110. At this time, the HMD device 100 detects the same maker, but the second temporary capture guide frame may be set in a region different from that of the first temporary capture guide frame due to the difference between the user's eye 310 and the camera unit 110. In this case, the HMD device 100 may set an overlap region between the first temporary capture guide frame and the second temporary capture guide frame to be the first capture guide frame. At this time, in the case that the first angle increases, the difference in set region between the first temporary capture guide frame and the second temporary capture guide frame may increase. Accordingly, in the case that the first angle is greater than the second angle, the first capture guide frame may be displayed at a position spaced farther away from the center point of the marker than the second capture guide frame. That is, the first guide position may be farther away from the center point of the marker than the second guide position. On the other hand, in the case the first angle decreases, the difference in set region between the first temporary capture guide frame and the second temporary capture guide frame may decrease. Accordingly, in the case the first angle is less than the second angle, the first capture guide frame may be displayed at a position closer to the center point of the marker than the second capture guide frame. That is, the first guide position may be closer to the center point of the marker than the second guide position.

FIG. 12 is a flowchart illustrating a method for an HMD device 100 to display a capture guide frame based on a distance between a camera unit 110 and a marker, according to one embodiment.

The HMD device 100 may detect a marker at a first position having a first distance from the camera unit 110 (S1210). Herein, the first distance may be a distance between the camera unit 110 and the marker, as illustrated in FIGS. 9A to 9C. The HMD device 100 may detect the marker at the first position based on the user's eye 310. The HMD device 100 may set a first temporary capture guide frame based on the user's eye 310. In addition, the HMD device 100 may detect the maker spaced the first distance from the camera unit 110, based on the camera unit 110. At this time, the HMD device 100 may set a second temporary capture guide frame based on the camera unit 110.

Next, the HMD device 100 may display a first capture guide frame having a first size based on the first position (S1220). In the case that the HMD device 100 detects the markers 250 and 260 at the first position having the first distance, the HMD device 100 may display the first capture guide frame having the first size. Herein, the first capture guide frame may be an overlap region between the first temporary capture guide frame and the second temporary capture guide frame, as illustrated in FIGS. 9A to 9C.

Next, the HMD device 100 may detect whether the first distance increases (S1230). In the case that the HMD device 100 detects that the first distance increases, the HMD device 100 may increase the first size of the first capture guide frame (S1240). On the other hand, in the case that the HMD device 100 detects that the first distance decreases, the HMD device 100 may decrease the first size of the first capture guide frame (S1250). At this time, the first temporary capture guide frame may be set based on the user's eye 310, as illustrated in FIGS. 9A to 9C. In addition, the second temporary capture guide frame may be set based on the camera unit 110. Accordingly, in the case that the distance between the camera unit 110 and the user's eye 310 increases, the difference in set region between the first temporary capture guide frame and the second temporary capture guide frame may increase. At this time, in the case that the distance between the camera unit 110 and the marker increases, the distance between the camera unit 110 and the user's eye 310 may relatively decrease. That is, in the case that the distance between the camera unit 110 and the marker increases, the difference in set region between the first temporary capture guide frame and the second temporary capture guide frame may decrease. Accordingly, in the case that the first distance increases, the HMD device 100 may increase the first size of the first capture guide frame. On the other hand, in the case that the first distance decreases, the HMD device 100 may reduce the first size of the first capture guide frame.

FIG. 13 is a flowchart illustrating a method for an HMD device 100 to control the size of a capture guide frame displayed based on a distance between a camera unit 110 and a marker, according to one embodiment.

The HMD device 100 may detect a marker at a first position having a first distance from the camera unit 110. In addition, the HMD device 100 may detect a marker at a second position having a second distance from the camera unit 110 (S1310). At this time, the HMD device 100 may detect the marker at the first position spaced the first distance from the camera unit 110, as illustrated in FIGS. 9A to 9C. At this time, the HMD device 100 may set a first temporary capture guide frame based on the user's eye 310. In addition, the HMD device 100 may detect the marker at the first position spaced the first distance from the camera unit 110, based on the camera unit. At this time, the HMD device 100 may set a second temporary capture guide frame based on the camera unit 110.

Next, the HMD device 100 may display a first capture guide frame having a first size based on the first position. In addition, the HMD device 100 may display a second capture guide frame having a second size based on the second position (S1320). Herein, the first capture guide frame and the second capture guide frame may be overlap regions between the first temporary capture guide frame and the second temporary capture guide frame, as illustrated in FIGS. 9A to 9C.

Next, the HMD device 100 may compare the first distance with the second distance (S1330). In the case that the first distance is greater than the second distance, the HMD device 100 may set the first size to be greater than the second size (S1340). That is, the HMD device 100 may set the first capture guide frame to have a larger size than the second capture guide frame. On the other hand, in the case that the first distance is less than the second distance, the HMD device 100 may set the first size to be less than the second size (S1350). That is, the HMD device 100 may set the first capture guide frame to have a smaller size than the second capture guide frame.

At this time, the first temporary capture guide frame may be set based on the user's eye 310, as illustrated in FIGS. 9A to 9C. In addition, the second temporary capture guide frame may be set based on the camera unit 110. Accordingly, in the case that the distance between the camera unit 110 and the user's eye 310 increases, the difference in set region between the first temporary capture guide frame and the second temporary capture guide frame may increase. At this time, in the case that the distance between the camera unit 110 and the marker increases, the distance between the camera unit 110 and the user's eye 310 may relatively decrease. That is, in the case that the distance between the camera unit 110 and the marker increases, the difference in set region between the first temporary capture guide frame and the second temporary capture guide frame may decrease.

Accordingly, in the case that the first distance is greater than the second distance, the first capture guide frame may be displayed with a larger size than the second capture guide frame. More specifically, the first capture guide frame includes a larger portion of the overlap region than the second capture guide frame, and thus the first capture guide frame may be displayed with a larger size than the second capture guide frame. In the case that the first distance is less than the second distance, the first capture guide frame may be displayed with a smaller size than the second capture guide frame. More specifically, the first capture guide frame includes a smaller portion of the overlap region than the second capture guide frame, and thus the first capture guide frame may be displayed with a smaller size than the second capture guide frame.

Further, although descriptions have been given for the respective drawings for ease of illustration, embodiments in the drawings may also be merged into a new embodiment. The scope of the present disclosure covers designing a recording medium readable by a computer having a program recorded to execute the previous embodiments as desired by those skilled in the art.

The HMD device 100 and a control method for the same according to the present disclosure are not limited to the above embodiments. Parts or all of the above embodiments can be selectively combined to make various variations.

Meanwhile, the HMD device 100 and a control method for the same in the present disclosure may be implemented in a recording medium as a code readable by a processor provided to a network device. The recording medium readable by the processor includes all kinds of recording devices to store data readable by the processor. Examples of the recording medium readable by the processor include ROMs, RAMs, magnetic tapes, floppy disks, and optical data storage devices. Examples also include implementation in the form of carrier wave such as transmission over the Internet. In addition, the recording medium readable by the processor may be distributed to a computer system connected over a network, and thus codes readable by the processor may be stored and executed in a distributed system.

As is apparent from the above description, the present invention has effects as follows.

According to the present disclosure, in the case that an HMD device detects a marker, the HMD device may set the position of a displayed capture guide frame based on an angle of the marker in relation to a camera.

According to the present disclosure, in the case that an HMD device detects a marker, the HMD device may set the size of a displayed capture guide frame based on an angle of the marker in relation to a camera.

According to the present disclosure, in the case that an HMD device detects a marker, the HMD device may set the size of a displayed capture guide frame based on a distance between the marker and a camera.

According to the present disclosure, in the case that an HMD device detects a marker, the HMD device may set the position of a displayed capture guide frame based on a distance between a marker and a camera.

According to the present disclosure, in the case that an HMD device detects a marker, the HMD device may set the position of a displayed capture guide frame based on a distance between a camera and a user's eye.

According to the present disclosure, in the case that a marker includes first and second markers, an HMD device may display a capture guide frame based on the positions at which the first and second markers are detected.

According to the present disclosure, an HMD device may detect a user's hand as a marker.

It will be apparent to those skilled in the art that various modifications and variations can be made in the present disclosure without departing from the spirit or scope of the present disclosure. Thus, the present invention is intended to cover the modifications and variations of this disclosure provided they come within the scope of the appended claims and their equivalents. The variations should not be separately understood from the spirit or prospect of the present disclosure.

In this specification, both a product invention and a method invention have been described. The descriptions thereof may be applicable as a supplement, when necessary.

What is claimed is:

1. A head mounted display (HMD) device comprising:
a camera unit configured to detect a marker positioned within a viewing angle;
a display unit configured to display a capture guide frame as an augmented reality image, based on the detected marker;
a processor configured to control the camera unit and the display unit,
wherein the processor is further configured to:
when the marker is detected at a first position having a first angle in relation to the camera unit, display a first capture guide frame having a first guide position based on the first position of the marker; and
when the marker is detected at a second position having a second angle in relation to the camera unit, display a second capture guide frame having a second guide position based on the second position of the marker,
wherein, when the first angle is greater than the second angle, the first guide position is farther away from a center point of the marker than the second guide position.

2. The HMD device according to claim 1, wherein the processor is further configured to display the first capture guide frame and the second capture guide frame based on position information of the camera unit and a user's eye.

3. The HMD device according to claim 2, wherein the processor is further configured to:
if the marker is detected at the first position,
display the first capture guide frame having the first guide position based on a first distance when a distance between the camera unit and the user's eye is the first distance; and
display a third capture guide frame having a third guide position based on a second distance when a distance between the camera unit and the user's eye is the second distance, and
wherein, when the first distance is greater than the second distance, the first guide position is farther away from the center point of the marker than the third guide position.

4. The HMD device according to claim 1, wherein the first capture guide frame has a first size, and the second capture guide frame has a second size, and
wherein, when the first angle is greater than the second angle, the first size is less than the second size.

5. The HMD device according to claim 1, wherein the processor is further configured to:
set a first temporary capture guide frame based on the first angle of the first position in relation to the camera unit; and
set a second temporary capture guide frame based on a third angle, the third angle being an angle of the first position in relation to a user's eye.

6. The HMD device according to claim 5, wherein the processor is further configured to display an overlap region between the first temporary capture guide frame and the second temporary capture guide frame as the first capture guide frame.

7. The HMD device according to claim 5, wherein the processor is further configured to display the second temporary capture guide frame as the first capture guide frame.

8. The HMD device according to claim 1, wherein the marker comprises a first marker and a second marker,
wherein the processor is further configured to display the first capture guide frame based on the first marker and the second marker, and
wherein the first capture guide frame is displayed in an inner region at a point of intersection between an extension line of the first marker and an extension line of the second marker.

9. The HMD device according to claim 8, wherein the processor is further configured to display the first capture guide frame in a shape of an image sensor.

10. The HMD device according to claim 8, wherein the processor is further configured to:
when an angle between the extension line of the first marker and the extension line of the second marker is a right angle or between the right angle and a threshold angle, display the first capture guide frame in the inner region at the point of intersection between the extension line of the first marker and the extension line of the second marker.

11. The HMD device according to claim 8, wherein the processor is further configured to:
when at least one of the first marker and the second marker is positioned outside the viewing angle transfer feedback to a user.

12. The HMD device according to claim 1, wherein the marker is a user's hand.

13. The HMD device according to claim 1, wherein the first capture guide frame is a capturable region by the camera unit according to a user's eye gaze in an inner region of the marker.

14. The HMD device according to claim 1, further comprising:
a sensor unit configured to detect at least one of a distance and angle between the marker and a user's eye, a distance and angle between the marker and the camera unit, and a distance and angle between the user's eye and the camera unit.

15. A method for controlling a head mounted display (HMD) device, the method comprising:
detecting a marker positioned within a viewing angle; and
displaying a capture guide frame as an augmented reality image, based on the detected marker,
wherein when the marker is detected at a first position having a first angle in relation to the camera unit, display a first capture guide frame having a first guide position based on the first position of the marker; and
when the marker is detected at a second position having a second angle in relation to the camera unit, display a second capture guide frame having a second guide position based on the second position of the marker,
wherein, when the first angle is greater than the second angle, the first guide position is farther away from a center point of the marker than the second guide position.

* * * * *